(12) United States Patent
Ishii

(10) Patent No.: US 7,334,653 B2
(45) Date of Patent: Feb. 26, 2008

(54) MECHANISM FOR CONTROLLING DISPLACEMENT OF VEHICLE HYDROSTATIC TRANSMISSION SYSTEM

(75) Inventor: Norihiro Ishii, Hyogo (JP)

(73) Assignee: Kanzaki Kokyukoki Mfg. Co., Ltd., Hyogo (JP)

( * ) Notice: Subject to any disclaimer, the term of this patent is extended or adjusted under 35 U.S.C. 154(b) by 267 days.

(21) Appl. No.: 11/267,187

(22) Filed: Nov. 7, 2005

(65) Prior Publication Data

US 2006/0102391 A1 May 18, 2006

(30) Foreign Application Priority Data

Nov. 12, 2004 (JP) .............................. 2004-329305

(51) Int. Cl.
*B62D 11/00* (2006.01)
(52) U.S. Cl. ...................................... 180/6.44; 180/6.2
(58) Field of Classification Search ................. 180/6.2, 180/6.44, 6.58, 6.62
See application file for complete search history.

(56) References Cited

FOREIGN PATENT DOCUMENTS

JP       10-095360       4/1998

*Primary Examiner*—Lesley D. Morris
*Assistant Examiner*—Marc A. Scharich
(74) *Attorney, Agent, or Firm*—Sterne, Kessler, Goldstein & Fox P.L.L.C.

(57) ABSTRACT

In a displacement-control mechanism for a vehicle hydrostatic transmission system including a traveling hydrostatic transmission (HST) and a steering hydrostatic transmission (HST), a steering link member is extended from a steering displacement-control device of the steering HST, and connected at an end thereof to the traveling-direction switching rotary member interlocking with a traveling manipulator for setting traveling speed and direction of the vehicle or with a traveling displacement-control device of the traveling HST. The traveling-direction switching rotary member is rotatable so as to be switched between a forward-traveling position and a backward-traveling position depending on whether the traveling manipulator is operated for forward traveling or backward traveling. A steering-setting rotary member is operatively connected to a steering manipulator for setting turning direction and angle of the vehicle so as to be rotatable centered on a pivotal shaft according to manipulation of the steering manipulator. The steering-setting rotary member is formed with a guide slot in which the end of the steering link member is slidably fitted. Both ends of the guide slot are disposed opposite to each other with respect to an axis of the pivotal shaft so as to move in opposite directions to each other during the rotation of the steering-setting rotary member, and the end of the steering link member is selectively disposed at one of the opposite ends of guide slot depending on whether the traveling-direction switching rotary member is disposed at the forward-traveling position or the backward-traveling position.

18 Claims, 21 Drawing Sheets

MECHANISM FOR CONTROLLING DISPLACEMENT OF VEHICLE HYDROSTATIC TRANSMISSION SYSTEM

BACKGROUND OF THE INVENTION

1. Field of the Invention

The present invention relates to a mechanism for controlling displacement of a hydrostatic transmission system of a vehicle, that is, a linkage between respective displacement-control devices (such as movable swash plates) of a hydrostatic stepless transmission for traveling (hereinafter referred to as a traveling HST) and a hydrostatic stepless transmission for steering (hereinafter referred to as a steering HST) installed on a vehicle.

2. Related Art

Conventionally, as disclosed in Japanese Laid Open Gazette No. Hei 10-95360, there is a well-known vehicle equipped with a traveling HST and a steering HST, wherein, while the output power of the traveling HST, whose direction can be switched between directions for forward traveling and for backward traveling, is transmitted to a pair of left and right axles, the output power of the steering HST, whose direction can be switched between directions for left turning and for right turning, is split into opposite rotational powers and the two powers are transmitted to the respective left and right axles so as to differentially rotate the left and right axles for making a turn of the vehicle.

The vehicle having the traveling HST and the steering HST especially requires the linkage between displacement-control devices of both the HSTs to be a reverse logic linkage, such as to coincide the steering operational direction (e.g., the turning direction of a steering wheel) with the actual left or right turning direction of the vehicle regardless of whether the traveling HST is set for forward traveling or backward traveling, thereby preventing wrong steering operation. For example, due to the reverse logic linkage, whether the vehicle travels forward or backward, the vehicle turns left by leftward rotation of a steering wheel. The vehicle may also or alternatively require the linkage between displacement-control devices of both the HSTs to be designed to reduce the output speed of the traveling HST in correspondence to the steering operational degree (e.g., the turning angle of a steering wheel from the straight traveling position), thereby preventing a high-speed sharp (or spin) turn.

In the prior art disclosed in the above-mentioned document, a conic mechanical linkage has an output section connected to servo-actuators for respective movable swash plates of the HSTs. The conic mechanical linkage has an input section connected to a forward/backward traveling direction selection lever for selecting the output direction of the traveling HST, and to a steering wheel for the output speed and direction of the steering HST. The conic mechanical linkage realizes the reverse logic linkage. The conic mechanical linkage also realizes reduction of traveling speed in correspondence to an increase of the turning angle of the steering wheel. However, the conic mechanical linkage is quite complicated because it requires three-dimensional angle adjustment among component parts or for other reasons.

It may be suggested that a hydraulic, pneumatic or electric actuator can replace the complicated mechanical linkage. However, if the vehicle is a small-size vehicle having no hydraulic pressure source but that for the HSTs, the hydraulic actuator is unreasonable in cost. Further, the pneumatic actuator requiring intake air of an engine, and the electric actuator are disadvantageous in convenience.

SUMMARY OF THE INVENTION

A vehicle comprises: left and right axles; a traveling manipulator for setting forward or backward traveling direction and speed of the vehicle; and a steering manipulator for setting left or right turning direction and angle of the vehicle.

A hydrostatic transmission system comprises: a variable displacement traveling hydrostatic transmission for driving left and right axles at variable common speed and in forward or backward common direction; and a variable displacement steering hydrostatic transmission for selectively accelerating one of the left and right axles and decelerating the other axle. The traveling hydrostatic transmission includes a traveling displacement-control device. A movement direction of the traveling displacement-control device is selected for selecting either the forward or backward common driving direction of the left and right axles depending on the forward or backward traveling direction setting of the traveling manipulator. A movement degree of the traveling displacement-control device is changed for changing the forward or backward common driving speed of the left and right axles depending on the traveling speed setting of the traveling manipulator. The steering hydrostatic transmission includes a steering displacement-control device. A movement direction of the steering displacement-control device is selected for selecting which of the axles to be accelerated or decelerated depending on the left or right turning direction setting of the steering manipulator. A movement degree of the steering displacement-control device is changed for changing the relative speed of the left and right axles depending on the turning angle setting of the traveling manipulator.

An object of the present invention is to provide a simple and inexpensive displacement-control mechanism of the hydrostatic transmission system for the vehicle, serving as a reverse logic linkage such as to ensure that the movement direction of the steering displacement-control device relative to the movement direction of the steering manipulator is reversible in correspondence to whether the traveling manipulator and the traveling displacement-control device are operated for forward traveling or backward traveling.

To achieve the object, in a first aspect of the invention, the displacement-control mechanism comprises: a steering link member extended from the steering displacement-control device; a traveling-direction switching rotary member interlocking with the traveling manipulator or the traveling displacement-control device; a mechanical biasing member; and a steering-setting rotary member operatively connected to the steering manipulator so as to be rotatable around a pivotal shaft according to manipulation of the steering manipulator. The steering link member has an end opposite to the steering displacement-control device. The steering link member is connected at the end thereof to the traveling-direction switching rotary member. The traveling-direction switching rotary member is rotatable so as to be switched between a forward-traveling position and a backward-traveling position depending on whether the traveling manipulator is operated for forward traveling or backward traveling. The mechanical biasing member is provided for switching the traveling-direction switching rotary member between the forward-traveling position and the backward-traveling position, and for retaining the traveling-direction switching rotary member at either the forward-traveling position or the backward-traveling position. The steering-setting rotary member is formed with a guide slot in which the end of the steering link member is slidably fitted. Both ends of the guide slot are disposed opposite to each other with respect to an axis of the pivotal shaft so as to move in opposite directions to each other during the rotation of the steering-setting rotary member. The end of the steering link member is selectively disposed at one of the opposite ends of the guide slot depending on whether the traveling-direction switching rotary member is disposed at the forward-traveling position or the backward-traveling position.

According to the first aspect, due to the two-position switching of the traveling-direction rotary member, the end of the steering link member is switched between the opposite ends of the guide slot of the steering-setting rotary member, so as to reverse the movement direction of the steering link member relative to the rotational direction of the steering-setting rotary member decided by the steering manipulator. In this way, the displacement control mechanism realizes the reverse logic that the movement direction of the steering displacement-control device relative to the movement direction of the steering manipulator is reversible in correspondence to whether the traveling manipulator and the traveling displacement-control device are disposed to set the traveling hydrostatic transmission into the forward traveling state or the backward traveling state. The mechanical biasing member for the two-position switching of the traveling-direction switching rotary member can be simple and inexpensive.

In a second aspect of the invention according to the first aspect, the axis of the pivotal shaft of the steering-setting rotary member is disposed in the guide slot between the opposite ends of the guide slot. When the traveling manipulator and the traveling displacement control device are disposed for setting the traveling hydrostatic transmission into a neutral state, the traveling-direction switching rotary member can be switched to a neutral position for setting the end of the steering link member onto the axis of the pivotal shaft in the guide slot of the steering-setting rotary member.

According to the second aspect, since the end of the steering link member, when being disposed on the axis of the pivotal shaft of the steering-setting rotary member, is immovable regardless of the rotation of the steering-setting rotary member by manipulation of the steering manipulator, the steering displacement-control device is disposed at its neutral position. Therefore, when the traveling manipulator and the traveling displacement-control device are disposed at their neutral positions, the steering hydrostatic transmission is prevented from driving, thereby preventing the vehicle from making an unexpected spin turn.

In a third aspect of the invention according to the first aspect, the traveling-direction switching rotary member includes a first portion and a second portion. The displacement-control mechanism further comprises a traveling link member extended from the traveling manipulator or the traveling displacement-control device. The traveling link member has an end opposite to the traveling manipulator or the traveling displacement-control device. The end of traveling link member is fitted to the traveling-direction switching rotary member so as to be movable relatively to the traveling-direction switching rotary member according to movement of the traveling manipulator or the traveling displacement-control device. The traveling-direction switching rotary member is disposed at the forward-traveling position when the end of the traveling link member is pressed against the first portion of the traveling-direction switching rotary member. The traveling-direction switching rotary member is disposed at the backward-traveling position when the end of the traveling link member is pressed against the second portion of the traveling-direction switching rotary member.

According to the third aspect, the rotation of the traveling-direction switching rotary member depends on the pressing of the end of the traveling link member against either the first and second portions of the traveling-direction switching rotary member, and requires no additional actuator, thereby realizing the simple and inexpensive reverse logic displacement-control mechanism.

In a fourth aspect of the invention according to the third aspect, the traveling-direction switching rotary member further comprises a slot, in which the end of the traveling link member is fitted so as to be movable therein in correspondence to the movement of the traveling manipulator or the traveling displacement-control device. Opposite ends of the slot of the traveling-direction switching rotary member serve as the first and second portions of the traveling-direction switching rotary member. The switching of the traveling-direction switching rotary member between the forward-traveling position and the backward-traveling position depends on the thrust of the end of the traveling link member against one of the ends of the slot of the traveling-direction switching rotary member, and on an overcenter spring action of the mechanical biasing member.

According to the forth aspect, the mechanical biasing member can be made of a simple and inexpensive overcenter spring whose overcenter spring action can establish the two-position switching of the traveling-direction switching rotary member. Further, the spring force can be used for retaining the traveling-direction switching rotary member at the forward or backward-traveling position. Therefore, during the rotation of the steering-setting rotary member by manipulation of the steering manipulator, the link ratio between the steering manipulator and the steering displacement-control device through the steering-setting rotary member and the steering link member is kept constant, thereby ensuring a reliable and stable action of the steering displacement-control device in response to the manipulation of the steering manipulator.

In a fifth aspect of the invention according to the third aspect, the traveling-direction switching rotary member further comprises a guide hole and an active portion. The guide hole has first and second edges serving as the respective first and second portions of the traveling-direction switching rotary member. The end of the traveling link member is fitted in the guide hole so as to be selectively movable along either the first or second edge in correspondence to movement of the traveling manipulator or the traveling displacement-control device, and pressed against the selective first or second edge by the biasing member. The active portion is selectively rotated in one of opposite directions depending on whether the first or second edge of the guide hole is pressed by the end of the traveling link member. The end of the steering link member is fitted onto the active portion so that the end of the steering link member is selectively disposed at one of the opposite ends of the guide slot of the steering-setting rotary member according to the rotation of the active portion.

According to the fifth aspect, due to the pressure of the end of the traveling link member biased by the biasing member, the traveling-direction switching rotary member performs a simple lever-like action to be switched between the forward-traveling position and the backward-traveling position. Further, the biasing force can be used for retaining the traveling-direction switching rotary member at the forward or backward-traveling position. Therefore, during the rotation of the steering-setting rotary member by manipulation of the steering manipulator, the link ratio between the steering manipulator and the steering displacement-control device through the steering-setting rotary member and the steering link member is kept constant, thereby ensuring a reliable and stable action of the steering displacement-control device in response to the manipulation of the steering manipulator. Such a biasing member can be made of a simple and inexpensive spring or the like.

In a sixth aspect of the invention according to the fifth aspect, the axis of the pivotal shaft of the steering-setting rotary member is disposed in the guide slot between the opposite ends of the guide slot. The guide hole of the traveling-direction switching rotary member further includes a third portion between the first and second edges. When the traveling manipulator and the traveling displacement-control device are disposed for setting the traveling hydrostatic transmission into a neutral state, the end of the traveling link member is disposed at the third portion so as to set the end of the steering link member onto the axis of the pivotal shaft in the guide slot of the steering-setting rotary member.

According to the sixth aspect, since the end of the steering link member, when being disposed on the axis of the pivotal shaft of the steering-setting rotary member, is immovable regardless of the rotation of the steering-setting rotary member by manipulation of the steering manipulator, the steering displacement-control device is disposed at its neutral position. Therefore, when the traveling manipulator and the traveling displacement-control device are disposed at their neutral positions, the steering hydrostatic transmission is prevented from driving, thereby preventing the vehicle from making an unexpected spin turn. Further, the biasing member can retain the end of the traveling link member at the third portion in the guide hole so as to prevent the end of the traveling link member from escaping therefrom, thereby keeping the immovable state of the end of the steering link member on the axis of the pivotal shaft of the steering-setting rotary member. Further, the biasing member can be made of a simple and inexpensive spring or the like.

In a seventh aspect of the invention according to the first aspect, the biasing member comprises a forward-traveling setting biasing member and a backward-traveling setting biasing member, and the traveling-direction switching rotary member comprises: a forward-traveling setting rotary member which can be switched between a neutral position and a forward-traveling position depending on an overcenter spring action of the forward-traveling setting biasing member; and a backward-traveling setting rotary member which can be switched between a neutral position and a backward-traveling position depending on an overcenter spring action of the backward-traveling setting biasing member. The end of the steering link member is disposed at one of the opposite ends of the guide slot of the steering-setting rotary member when the forward-traveling setting rotary member is disposed at the forward-traveling position and the backward-traveling setting rotary member is disposed at the neutral position. The end of the steering link member is disposed at the other end of the guide slot of the steering-setting rotary member when the forward-traveling setting rotary member is disposed at the neutral position and the backward-traveling setting rotary member is disposed at the backward-traveling position.

According to the seventh aspect, the traveling-direction switching rotary member comprising the forward-traveling setting rotary member and the backward-traveling setting rotary member further ensures the switching of the end of the steering link member between the opposite ends of the guide slot of the steering-setting rotary member.

In an eighth aspect of the invention according to the seventh aspect, the axis of the pivotal shaft of the steering-setting rotary member is disposed in the guide slot between the opposite ends of the guide slot. The end of the steering link member is disposed on the axis of the pivotal shaft in the guide slot of the steering-setting rotary member when the forward-traveling setting rotary member and the backward-traveling setting rotary member are disposed at the respective neutral positions.

According to the eighth aspect, since the end of the steering link member, when being disposed on the axis of the pivotal shaft of the steering-setting rotary member, is immovable regardless of the rotation of the steering-setting rotary member by manipulation of the steering manipulator, the steering displacement-control device is disposed at its neutral position. Therefore, when the traveling manipulator and the traveling displacement-control device are disposed at their neutral positions, the steering hydrostatic transmission is prevented from driving, thereby preventing the vehicle from making an unexpected spin turn.

Alternatively, to achieve the object, in a ninth aspect of the invention, the displacement-control mechanism comprises: a first steering link member extended from the steering manipulator; a second steering link member extended from the steering displacement-control device; a common end of the first and second steering link members; and a steering-setting rotary member operatively connected to the traveling manipulator or the traveling displacement-control device. The steering-setting rotary member is rotatable around a pivotal shaft so as to be switched between a forward-traveling position and a backward-traveling position. The steering-setting rotary member is disposed at the forward-traveling position when the traveling manipulator and the traveling displacement-control device are disposed so as to set the traveling hydrostatic transmission into a forward traveling state. The steering-setting rotary member is disposed at the backward-traveling position when the traveling manipulator and the traveling displacement-control device are disposed so as to set the traveling hydrostatic transmission into a backward traveling state. The steering-setting rotary member includes a guide slot in which the common end is fitted so as to be slidable therealong according to manipulation of the steering manipulator. Both ends of the guide slot are disposed opposite to each other with respect to an axis of the pivotal shaft so as to move in opposite directions to each other during the rotation of the steering-setting rotary member. A movement direction of the second steering link member relative to a movement direction of the common end along the guide slot is reversible in correspondence to whether the steering-setting rotary member is disposed at the forward-traveling position or the backward-traveling position.

According to the ninth aspect, due to the two-position switching of the steering-setting rotary member, the movement direction of the second steering link member relative to the movement direction of the common end of the first and second steering link members along the guide slot of the steering-setting rotary member by manipulation of the steering manipulator is reversible, thereby realizing the reverse logic that the movement direction of the steering displacement-control device relative to the movement direction of the steering manipulator is reversible in correspondence to whether the traveling manipulator and the traveling displacement-control device are disposed to set the traveling hydrostatic transmission into the forward traveling state or the backward traveling state.

In a tenth aspect of the invention according to the ninth aspect, when the traveling manipulator and the traveling displacement-control device are disposed so as to set the traveling hydrostatic transmission into a neutral state, the steering-setting rotary member is disposed at a neutral position where the second steering link member is immovable regardless of the movement of the common end of the first and second steering link members along the guide slot by manipulation of the steering manipulator.

According to the tenth aspect, when the traveling manipulator and the traveling displacement-control device are disposed at their neutral positions, the second steering link member set to be immovable prevents the steering hydrostatic transmission from driving, thereby preventing the vehicle from making an unexpected spin turn.

In an eleventh aspect of the invention according to the ninth aspect, the displacement-control mechanism further comprises a traveling-direction switching rotary member and a mechanical biasing member. The traveling-direction switching rotary member is operatively interposed between the steering-setting rotary member and the traveling manipulator or the traveling displacement-control device. The traveling-direction switching rotary member is rotatable so as to be switched between a forward-traveling position and a backward-traveling position depending on whether the traveling manipulator and the traveling displacement-control device are disposed so as to set the traveling hydrostatic transmission into the forward traveling state or the backward traveling state. The mechanical biasing member is provided for switching the traveling-direction switching rotary member between the forward-traveling position and the backward-traveling position, and for retaining the traveling-direction switching rotary member at the forward-traveling position or the backward-traveling position. The switching of the steering-setting rotary member between the forward-traveling position and the backward-traveling position depends on the switching of the traveling-direction switching rotary member between the forward-traveling position and the backward-traveling position.

According to the eleventh aspect, due to the two-position switching of the traveling-direction rotary member, the steering-setting rotary member is switched between the forward-traveling position and the backward-traveling position, so as to reverse the movement direction of the second steering link member relative to the movement direction of the common end of the first and second steering link member along the guide slot of the steering-setting rotary member decided by the steering manipulator. In this way, the displacement control mechanism realizes the reverse logic that the movement direction of the steering displacement-control device relative to the movement direction of the steering manipulator is reversible in correspondence to whether the traveling manipulator and the traveling displacement-control device are disposed to set the traveling hydrostatic transmission into the forward traveling state or the backward traveling state. The mechanical biasing member for the two-position switching of the traveling-direction switching rotary member can be simple and inexpensive.

In a twelfth aspect of the invention according to the eleventh aspect, when the traveling manipulator and the traveling displacement-control device are disposed so as to set the traveling hydrostatic transmission into a neutral state, the traveling-direction switching rotary member is disposed at a neutral position so as to set the steering-setting rotary member at a neutral position where the second steering link member is immovable regardless of the movement of the common end of the first and second steering link members along the guide slot by manipulation of the steering manipulator.

According to the twelfth aspect, when the traveling manipulator and the traveling displacement-control device are disposed at their neutral positions, the traveling-direction switching rotary member and the steering-setting rotary member are disposed at the respective neutral positions so as to make the second steering link member immovable, thereby preventing the steering hydrostatic transmission from driving, and thereby preventing the vehicle from making an unexpected spin turn.

In a thirteenth aspect of the invention according to the eleventh aspect, the traveling-direction switching rotary member includes a first portion and a second portion. The displacement-control mechanism further comprises a traveling link member extended from the traveling manipulator or the traveling displacement-control device. The traveling link member has an end opposite to the traveling manipulator or the traveling displacement-control device. The end of the traveling link member is fitted to the traveling-direction switching rotary member so as to be movable relatively to the traveling-direction switching rotary member according to movement of the traveling manipulator or the traveling displacement-control device. The traveling-direction switching rotary member is disposed at the forward-traveling position when the end of the traveling link member is pressed against the first portion of the traveling-direction switching rotary member. The traveling-direction switching rotary member is disposed at the backward-traveling position when the end of the traveling link member is pressed against the second portion of the traveling-direction switching rotary member.

According to the thirteenth aspect, the rotation of the traveling-direction switching rotary member depends on the pressing of the end of the traveling link member against one of the first and second portions of the traveling-direction switching rotary member, and requires no additional actuator, thereby realizing the simple and inexpensive reverse logic displacement-control mechanism.

In a fourteenth aspect of the invention according to the thirteenth aspect, the traveling-direction switching rotary member further comprises a slot, in which the end of the traveling link member is fitted so as to be movable therein in correspondence to the movement of the traveling manipulator or the traveling displacement-control device. Opposite ends of the slots of the traveling-direction switching rotary member serve as the first and second portions of the traveling-direction switching rotary member. The switching of the traveling-direction switching rotary member between the forward-traveling position and the backward-traveling position depends on thrust of the end of the traveling link member against one of the ends of the slot of the traveling-direction switching rotary member, and on an overcenter spring action of the mechanical biasing member.

According to the fourteenth aspect, the mechanical biasing member can be made of a simple and inexpensive overcenter spring whose overcenter spring action can establish the two-position switching of the traveling-direction switching rotary member. Further, the steering-setting rotary member can be retained at the forward or backward-traveling position by use of the spring force of the biasing member for retaining the traveling-direction switching rotary member at the forward or backward-traveling position. Therefore, during the movement of the common end of the first and second steering link members along the guide slot of the steering-setting rotary member by manipulation of the steering manipulator, the link ratio between the steering manipulator and the steering displacement-control device through the steering-setting rotary member and the first and second steering link members is kept constant, thereby ensuring a reliable and stable action of the steering displacement-control device in response to the manipulation of the steering manipulator.

In a fifteenth aspect of the invention according to the thirteenth aspect, the traveling-direction switching rotary member further comprises a guide hole and an active portion. The guide hole has first and second edges serving as the first and second portions of the traveling-direction switching rotary member. The end of the traveling link member is fitted in the guide hole so as to be selectively movable along either the first or second edge in correspondence to movement of the traveling manipulator or the traveling displacement-control device, and pressed against the selective first or second edge by the biasing member. The active portion is selectively rotated in one of opposite directions depending on whether the first or second edge of the guide hole is pressed by the end of the traveling link member. The steering-setting rotary member is fitted to the active portion so that the steering-setting rotary member is switched between the forward-traveling position and the backward-traveling position according to the rotation of the active portion.

According to the fifteenth aspect, due to the pressure of the end of the traveling link member biased by the biasing member, the traveling-direction switching rotary member performs a simple lever-like action to be switched between the forward-traveling position and the backward-traveling position. Further, the biasing force can be used for retaining the traveling-direction switching rotary member at the forward or backward-traveling position, thereby retaining the steering-setting rotary member at the forward or backward-traveling position. Therefore, during the movement of the common end of the first and second steering link members along the guide slot of the steering-setting rotary member by manipulation of the steering manipulator, the link ratio between the steering manipulator and the steering displacement-control device through the steering-setting rotary member and the first and second steering link members is kept constant, thereby ensuring a reliable and stable action of the steering displacement-control device in response to the manipulation of the steering manipulator. Such a biasing member can be made of a simple and inexpensive spring or the like.

In a sixteenth aspect of the invention according to the fifteenth aspect, the guide hole of the traveling-direction switching rotary member further includes a third portion between the first and second edges. The end of the traveling link member is disposed at the third portion when the traveling manipulator and the traveling displacement-control device are disposed for setting the traveling hydrostatic transmission into a neutral state. When the end of the traveling link member is disposed at the third portion, the steering-setting rotary member is disposed at a neutral position where the second steering link member is immovable regardless of movement of the common end of the first and second steering link members along the guide slot of the steering-setting rotary member by manipulation of the steering manipulator.

According to the sixteenth aspect, when the traveling manipulator and the traveling displacement-control device are disposed at their neutral positions, the traveling-direction switching rotary member and the steering-setting rotary member are disposed at the respective neutral positions so as to make the second steering link member immovable, thereby preventing the steering hydrostatic transmission from driving, and thereby preventing the vehicle from making an unexpected spin turn. Further, the steering-setting rotary member can be retained at the forward or backward-traveling position by use of the spring force of the biasing member for retaining the traveling-direction switching rotary member at the forward or backward-traveling position. The biasing member can be made of a simple and inexpensive spring or the like.

In a seventeenth aspect of the invention according to the thirteenth aspect, the biasing member comprises a forward-traveling setting biasing member and a backward-traveling setting biasing member, and the traveling-direction switching rotary member comprises: a forward-traveling setting rotary member which can be switched between a neutral position and a forward-traveling position depending on an overcenter spring action; and a backward-traveling setting rotary member which can be switched between a neutral position and a backward-traveling position depending on an overcenter spring action. The steering-setting rotary member is disposed at the forward-traveling position when the forward-traveling setting rotary member is disposed at the forward-traveling position and the backward-traveling setting rotary member is disposed at the neutral position. The steering-setting rotary member is disposed at the backward-traveling position when the forward-traveling setting rotary member is disposed at the neutral position and the backward-traveling setting rotary member is disposed at the backward-traveling position.

According to the seventeenth aspect, the traveling-direction switching rotary member comprising the forward-traveling setting rotary member and the backward-traveling setting rotary member further ensures the switching of the steering-setting rotary member between the forward-traveling position and the backward-traveling position.

In an eighteenth aspect of the invention according to the seventeenth aspect, when the forward-traveling setting rotary member and the backward-traveling setting rotary member are disposed at the respective neutral positions, the second steering link member is immovable regardless of movement of the common end of the first and second steering link members along the guide slot of the steering-setting rotary member by manipulation of the steering manipulator.

According to the eighteenth aspect, when the traveling manipulator and the traveling displacement-control device are disposed at their neutral positions, the steering hydrostatic transmission is prevented from driving, thereby preventing the vehicle from making an unexpected spin turn.

These, further and other objects, features, and advantages will appear more fully from the following description with accompanying drawings.

DETAILED DESCRIPTION OF THE INVENTION

Figure 1:
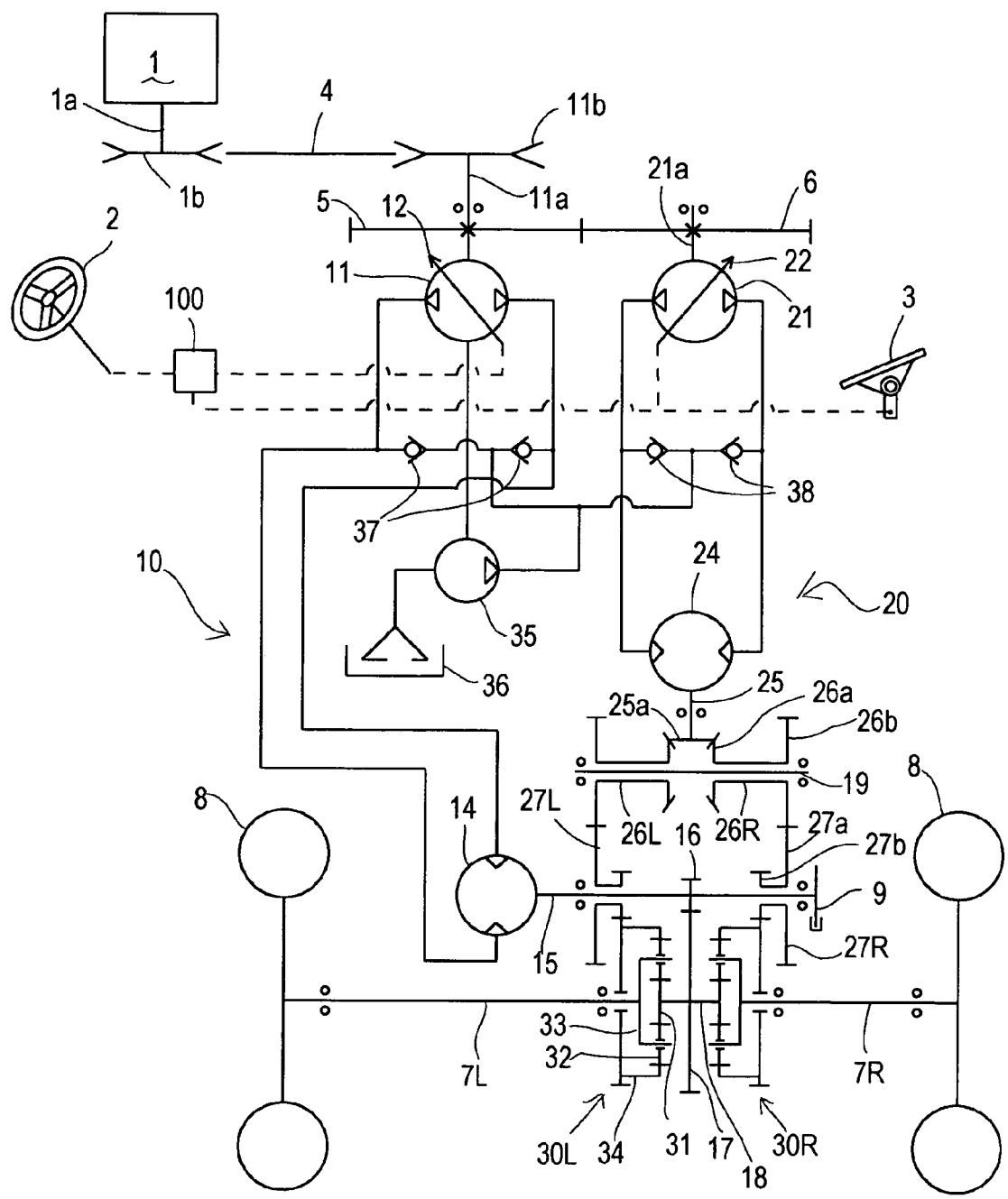
FIG. 1 is a hydraulic circuit and mechanical structural diagram of a vehicle including a traveling HST 10 and a steering HST 20, employing a displacement-control mechanism 100 of the present invention.

Referring to FIG. 1, description will be given of an embodiment of a structural and hydraulic circuit system for driving a vehicle, employing a displacement-control mechanism 100 according to the present invention.

The vehicle is equipped with an engine 1, a traveling HST 10 and a steering HST 20. Traveling HST 10 comprises a variable displacement traveling hydraulic pump 11 and a traveling hydraulic motor 14 hydraulically connected with pump 11. Each of traveling hydraulic pump 11 and motor 14 is an axial piston type, or alternatively, it may be a radial piston type. Steering HST 20 comprises a variable displacement steering hydraulic pump 21 and a steering hydraulic motor 24 hydraulically connected with pump 21. Each of steering hydraulic pump 21 and motor 24 is an axial piston type, or alternatively, it may be a radial piston type. Traveling hydraulic pump 11 has a pump shaft 11a with an input pulley 11b fixed thereon. A drive belt 4 is wound between input pulley 11b and an output pulley 1b fixed on an engine output shaft 1a of engine 1. A gear 5 fixed on pump shaft 11a is engaged with a gear 6 fixed on a pump shaft 21a of steering hydraulic pump 21. In this way, pump shaft 11a of traveling hydraulic pump 11 serves as an input shaft for splitting power from engine 1 between HST 10 and HST 20. Alternatively, pump shaft 21a of steering hydraulic pump 21 may have an input pulley fixed thereon for inputting engine power and for splitting rotational power of pump shaft 21a between HST 10 and HST 20.

Pump shaft 11a also serves as a drive shaft of a charge pump 35, which supplies oil reserved in an oil tank 36 to a lower-pressurized oil passage of traveling HST 10 via one of check valves 37 and 37, and to a lower-pressurized oil passage of steering HST 20 via one of check valves 38 and 38.

The vehicle has left and right axles 7L and 7R with respective wheels 8 attached thereon. Axles 7L and 7R are differentially connected with each other via left and right planetary gear units 30L and 30R, which have a common sun gear shaft 18. Sun gears of planetary gear units 30L and 30R are fixed on respective opposite ends of sun gear shaft 18. Axles 7L and 7R are fixedly provided on inner ends thereof with respective carriers 33. Each carrier 33 pivotally supports planetary gears 32 engaged with corresponding sun gear 31. A steering input gear 34 is loosely fitted on each of axles 7L and 7R. Each steering input gear 34 comprises an internal gear and an external gear. The internal gear is engaged with corresponding planetary gears 32.

A gear 16 is fixed on a motor shaft 15 of traveling hydraulic motor 14, a traveling input gear (bull gear) 17 is fixed on sun gear shaft 18, and gears 16 and 17 are engaged with each other, so as to constitute a deceleration gear train. The deceleration gear train composed of gears 16 and 17 transmits output power from traveling hydraulic motor 14 to common sun gear shaft 18 of planetary gear units 30L and 30R to rotate sun gears 31 of planetary gear units 30L and 30R in the same direction at the same speed. The rotational speed of sun gears 31 depends on the tilt angle of a movable swash plate 12 which serves as a displacement-control device of traveling hydraulic pump 11. The rotational direction of sun gears 31 depends on whether movable swash plate 12 is tilted from a neutral position thereof into a direction for forward traveling or a direction for backward traveling. The tilt angle and direction of movable swash plate 12 is basically determined by the depression degree and direction of an accelerator pedal 3, serving as a traveling manipulator of the vehicle for setting the forward or backward traveling direction and the traveling speed of the vehicle.

A bevel-type motor gear 25a is fixed on a motor shaft 25 of steering hydraulic motor 24. Mutually facing gear members 26L and 26R are relatively rotatably fitted on a power-splitting shaft 19 arranged perpendicularly to motor shaft 25. Each of gear members 26L and 26R is fixedly provided (or integrally formed) with a bevel input gear 26a and an output gear 26b. Bevel input gears 26a and 26a are engaged with motor gear 25a placed therebetween. Therefore, gear members 26L and 26R are rotated in opposite directions as motor shaft 25 rotates.

Mutually facing gear members 27L and 27R are relatively rotatably fitted on motor shaft 15 of traveling hydraulic motor 14. Each of gear members 27L and 27R are fixedly provided (or integrally formed) with an input gear 27a and an output gear 27b. Each input gear 27a is engaged with output gear 26b of each of gear members 26L and 26R. Each output gear 27b is engaged with the external gear of steering input gear 34 of each of planetary gear units 30L and 30R.

In this way, rotational force of motor shaft 25 of steering hydraulic motor 24 is split between left and right steering input gears 34 and 34 of respective planetary gear units 30L and 30R via the left deceleration gear train composed of gear members 26L and 27L and the right deceleration gear train composed of gear members 26R and 27R, thereby rotating steering input gears 34 and 34 in opposite directions. More precisely, gear 34 (axle 7L or 7R) on the inside of a turning vehicle is referred to as "inside gear 34 (inside axle 7L or 7R)", and gear 34 (axle 7R or 7L) on the outside of the turning vehicle is referred to "outside gear 34 (outside axle 7R or 7L)". While a vehicle turns, outside and inside gears 34 and 34 are rotated at the same speed, however, outside gear 34 is rotated in the opposite direction to corresponding sun gear 31, and inside gear 34 is rotated in the same direction with corresponding sun gear 31. The same rotational speed of gears 34 depends on the tilt angle of a movable swash plate 22 which serves as a displacement-control device of steering hydraulic pump 21. The rotational directions of gears 34 depend on whether movable swash plate 22 is tilted from the neutral position thereof into a left-turning direction or a right-turning direction. The tilt angle and direction of movable swash plate 22 are basically determined by the turning degree and direction of a steering wheel 2, serving as a steering manipulator for setting the left or right turning direction and the turning angle of the vehicle.

Planetary gears 32 of each of planetary gear units 30L and 30R are revolved around sun gear 31 by the combined rotational force of its steering input gear 34 and sun gear 31, thereby rotating corresponding carrier 33 to drive each of axles 7L and 7R. Due to the mutually opposite rotation of left and right steering input gears 34, inside axle 7L or 7R is decelerated, and outside axle 7R or 7L is accelerated, so as to make a turn of the vehicle to the decelerated inside. If the rotational force of inside gear 34 exceeds that of corresponding sun gear 31, the rotational direction of inside axle 7L or 7R becomes opposite to the forward or backward direction set by accelerator pedal 3.

Displacement-control mechanism 100 is designed to control movable swash plate 22 of steering hydraulic pump 21 in response to manipulation of steering wheel 2 and accelerator pedal 3. Displacement-control mechanism 100 is further designed to establish a reverse logic linkage with only mechanical components without using any actuator such as a hydraulic, pneumatic, or electromagnetic actuator or any electronic control system. More precisely, due to displacement-control mechanism 100, the tilt direction of movable swash plate 22 of steering hydraulic pump 21 relative to the turning direction of steering wheel 2 is reversible in correspondence to whether accelerator pedal 3 is depressed for forward traveling or backward traveling, so that the vehicle can turn to the same direction as the turned direction of steering wheel 2 regardless of whether the vehicle travels forward or backward.

Referring to FIGS. 2 to 5, description will be given of a displacement-control mechanism 100A as a first embodiment of displacement-control mechanism 100. Hereinafter, directions about motions, positions, etc. of components of displacement-control mechanism 100A will be stated on the basis of directions as seen in FIG. 2 to FIG. 5 for convenience. Similarly, in each of descriptions of following displacement-control mechanisms 100B to 100G shown in FIGS. 6 to 23, serving as second to sixth embodiments of displacement-control mechanism 100, directions about motions, positions, etc. of components will be stated on the basis of directions as seen in each of the drawings, unless there is a special statement of a direction about any component.

Figure 2:
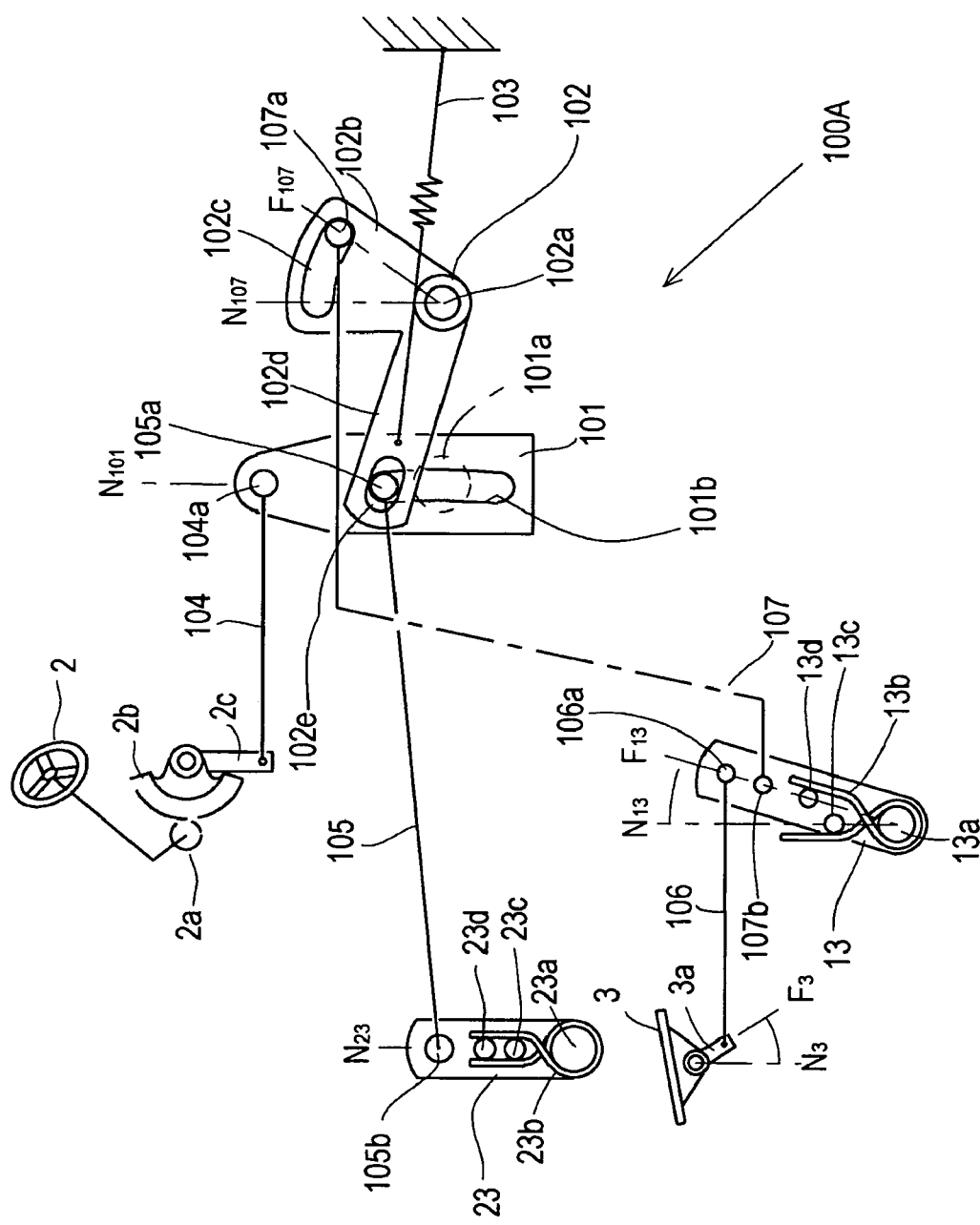
FIG. 2 is a structural diagram of a displacement-control mechanism 100A according to a first embodiment of the present invention, when an accelerator pedal 3 is depressed for forward traveling while keeping a steering wheel 2 at a straight traveling (neutral) position.

As shown in FIG. 2, a traveling-speed control lever 13 is pivoted onto traveling HST 10 via a pivotal shaft 13a so as to be turnable (rotatable) substantially integrally with traveling movable swash plate 12, thereby constituting the traveling displacement-control device. A steering-speed control lever 23 is pivoted onto steering HST 20 via a pivotal shaft 23a so as to be turnable (rotatable) substantially integrally with steering movable swash plate 22, thereby constituting the steering displacement-control device. A neutral-returning spring 13b is fitted round pivotal shaft 13a of traveling-speed control lever 13. A neutral-returning spring 23b is fitted round pivotal shaft 23a of steering-speed control lever 23. A push pin 13d is fixed on traveling-speed control lever 13. A push pin 23d is fixed on steering-speed control lever 23. Traveling HST 10 is provided with an immovable neutral-positioning pin 13c for defining a neutral position of traveling-speed control lever 13. Steering HST 20 is provided with an immovable neutral-positioning pin 23c for defining a neutral position of steering-speed control lever 23. Neutral-returning spring 13b pinches pins 13c and 13d between both ends thereof. Neutral-returning spring 23b pinches pins 23c and 23d between both ends thereof. As each of levers 13 and 23 is turned, corresponding pin 13d or 22d pushes one end of corresponding neutral-returning spring 13b or 23b away from the other end thereof retained by corresponding neutral-positioning pin 13c or 23c, whereby each neutral-returning spring 13b or 23b causes a biasing force for returning each of levers 13 and 23 to the neutral position.

Accelerator pedal 3 is provided with an integrally rotatable arm 3a. A link rod 106 is extended from a rotatable tip end of arm 3a, and an end pin 106a of link rod 106 opposite to arm 3a (accelerator pedal 3) is pivotally supported on a rotatable tip end of traveling-speed control lever 13. Arm 3a is extended downward, i.e., vertically opposite to accelerator pedal 3 with respect to a pivotal shaft of accelerator pedal 3. Seesaw-like shaped accelerator pedal 3 is integrally formed with a front depressed portion in front of the pivotal shaft thereof (in FIG. 2, on the left side of the pivotal shaft), and with a rear depressed portion behind the pivotal shaft thereof (in FIG. 2, on the right side of the pivotal shaft). The front depressed portion is depressed for setting forward-traveling speed of the vehicle in front of the pivotal shaft thereof, and with a rear depressed portion (a right part in FIG. 2) for setting backward-traveling speed of the vehicle behind the pivotal shaft thereof.

Referring to FIG. 2, in the turning range of arm $3a$ of accelerator pedal 3, a position $N_3$ of arm 3 corresponds to a neutral position of accelerator pedal 3, and a position $F_3$ of arm 3 on the right side of position $N_3$ corresponds to a forward-maximum-speed position of arm 3. A position $N_{13}$ of the rotational tip end of traveling-speed control lever 13 corresponds to neutral position $N_3$ of arm $3a$. A position $F_{13}$ of the rotational tip end of traveling-speed control lever 13 corresponds to forward-maximum-speed position $F_3$ of arm 3. In FIG. 2, accelerator pedal 3 is fully depressed for forward traveling (the front depressed portion thereof is fully depressed) so as to set arm $3a$ and traveling-speed control lever 13 at respective forward-maximum-speed positions $F_3$ and $F_{13}$.

Figure 4:
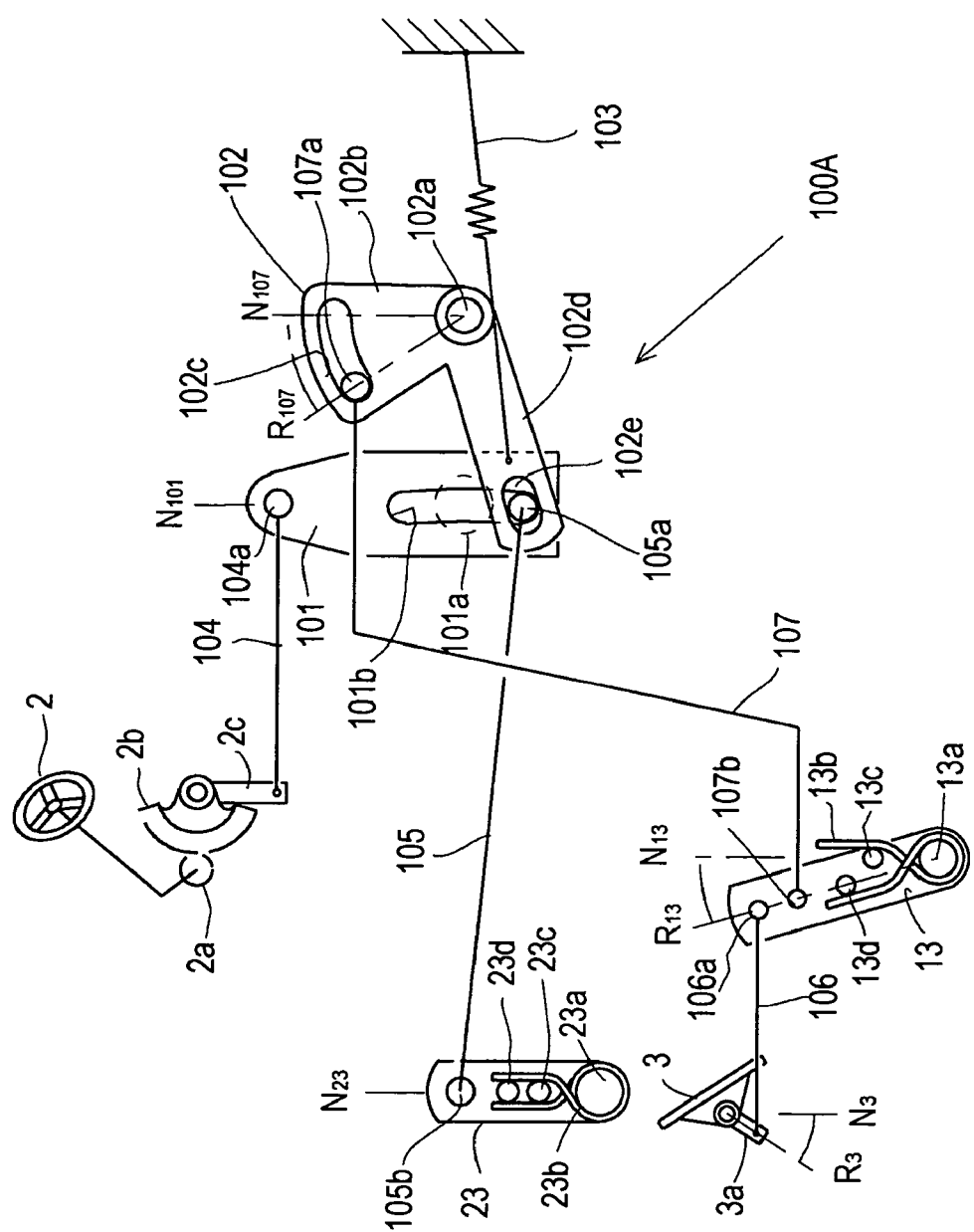
FIG. 4 is a structural diagram of displacement-control mechanism 100A when accelerator pedal 3 is depressed for backward traveling while keeping steering wheel 2 at the straight traveling (neutral) position.

Referring to FIG. 4, a position of $R_3$ of arm $3a$ on the left side of neutral position $N_3$ corresponds to a backward-maximum-speed position of arm 3. A position $R_{13}$ of the rotational tip end of traveling-speed control lever 13 corresponds to backward-maximum-speed position $R_3$ of arm $3a$. In FIG. 4, accelerator pedal 3 is fully depressed for backward traveling (the rear depressed portion of thereof is fully depressed) so as to set arm $3a$ and traveling-speed control arm $13a$ at respective backward-maximum-speed positions $R_3$ and $R_{13}$. Hereinafter, the above-described positions $N_3$, $F_3$, $R_3$ of arm $3a$ are respectively designated as neutral position $N_3$, forward-maximum-speed position $F_3$, backward-maximum-speed position $R_3$ of "accelerator pedal 3".

A steering-setting rotary plate 101 formed with an arcuate guide slot $101b$ is pivoted on a pivotal shaft $101a$. A steering link rod 105 is provided at one end thereof with an end pin $105a$ slidably fitted into guide slot $101b$, and at the other end thereof with an end pin $105b$ pivoted onto a rotational tip end of steering-speed control lever 23. Link rod 105 is configured so that end pin $105a$ can rotate along guide slot $101b$ centered on end pin $105b$.

A pinion $2a$ is provided at a bottom portion of a pivotal stem of steering wheel 2, and is engaged with a sector gear $2b$, which is provided with an integrally rotatable arm $2c$. A link rod 104 is extended from arm $2c$, and an end pin $104a$ of link rod 104 opposite to arm $2c$ (steering wheel 2) is pivotally supported by a rotational tip portion of steering-setting rotary plate 101.

A forward/backward traveling-direction switching rotary plate 102 is pivoted on a pivotal shaft $102a$. Substantially L-like shaped traveling-direction switching rotary plate 102 is bent at pivotal shaft $102a$, and has a first arm $102b$, which is extended (upward) from pivotal shaft $102a$ to be connected to traveling-speed control lever 13. First arm $102b$ has a considerably wide arcuate rotational tip edge, along which a slot $102c$ is formed. An end pin $107a$ of a traveling link rod 107 extended from traveling-speed control lever 13 is slidably inserted into slot $102c$. Alternatively, a link rod extended from arm $3a$ of speed-control arm 3 may be directly connected to traveling-direction switching rotary plate 102 without the relay of traveling-speed control lever 13.

Slot $102c$ has a length enough to permit end pin $107a$ to move therealong from $N_{107}$ to $F_{107}$ shown in FIG. 2 corresponding to the turning of traveling-speed control lever 13 from neutral position $N_{13}$ to forward-maximum-speed position $F_{13}$, and to move therealong from $N_{107}$ to $R_{107}$ shown in FIG. 4 corresponding to the turning of traveling-speed control lever 13 from neutral position $N_{13}$ to backward-maximum-speed position $R_{13}$. The full stroke of accelerator pedal 3 in the forward-traveling range is equal to that in the backward-traveling range, so that the turning range of traveling-speed control lever 13 from neutral position $N_{13}$ to forward-maximum-speed position $F_{13}$ and the shift range of end pin $107a$ from $N_{107}$ to $F_{107}$ are equal to the turning range of traveling-speed control lever 13 from neutral position $N_{13}$ to backward-maximum-speed position $R_{13}$ and the shift range of end pin $107a$ from $N_{107}$ to $R_{107}$, respectively. The same condition is set in each of later-discussed displacement-control mechanisms 100B to 100G (even if traveling-speed control lever 13 is replaced with a traveling-speed control lever 213 and link rod 107 is replaced with link rods 207F and 207R).

Traveling-direction switching rotary plate 102 has a second arm $102d$, which is extended (leftward) from pivotal shaft $102a$ so as to be connected to steering-speed control lever 23. Second arm $102d$ is formed with a slot $102e$ extend along the extending direction of second arm $102d$ so as to substantially perpendicularly overlap with guide slot $101b$, whereby end pin $105a$ of link rod 105, inserted into guide slot $101b$ as described above, is also inserted into slot $102e$.

Furthermore, with respect to FIG. 2, second arm $102d$ is pulled rightward by a tension spring 103, which has one end connected to second arm portion $102d$, and the other end immovably fixed on the vehicle. The position of second arm $102d$ (traveling-direction switching rotary plate 102), when end pin $105a$ of link rod 105 inserted into guide slots $101b$ and $102e$ is positioned at the middle of guide slot $101b$ (i.e., on the axis of pivotal shaft $101a$), is defined as a balance point thereof. If second arm $102d$ slightly moves upward or downward from the balance point, spring 103 performs an overcenter spring action such that second arm $102d$ quickly turns further upward or downward to make end pin $105a$ reach either the upper or lower end of guide slot $101b$. In this way, due to the overcenter action of spring 103, traveling-direction switching rotary plate 102 is switched between two positions, i.e., between a forward-traveling position where end pin $105a$ is positioned at the upper end of guide slot $101b$ (cf. FIG. 2 and FIG. 3) and a backward-traveling position where end pin $105a$ is positioned at the lower end of guide slot $101b$ (cf. FIG. 4 and FIG. 5).

Due to the above-mentioned length of slot $102c$, in the state that traveling-direction switching rotary plate 102 is disposed at the forward-traveling position, end pin $107a$ slides along slot $102c$ from position $N_{107}$ to position $F_{107}$ without pushing first arm portion $102b$ as traveling-speed control lever 13 is turned from neutral position $N_{13}$ to forward-maximum-speed position $F_{13}$. Similarly, in the state that traveling-direction switching rotary plate 102 is disposed at the backward-traveling position, end pin $107a$ slides along slot $102c$ from position $N_{107}$ to position $R_{107}$ without pushing first arm portion $102b$ as traveling-speed control lever 13 is turning from neutral position $N_{13}$ to backward-maximum-speed position $R_{13}$. In other words, while the depression of accelerator pedal 3 may be changed between neutral position $N_3$ and forward-maximum-speed position $F_3$, traveling-direction switching rotary plate 102 once switched to the forward-traveling position is held at the forward-traveling position. Similarly, while the depression of accelerator pedal 3 may be changed between neutral position $N_3$ and backward-maximum-speed position $R_3$, traveling-direction switching rotary plate 102 once switched to the backward-traveling position is held at the backward-traveling position.

Figure 3:
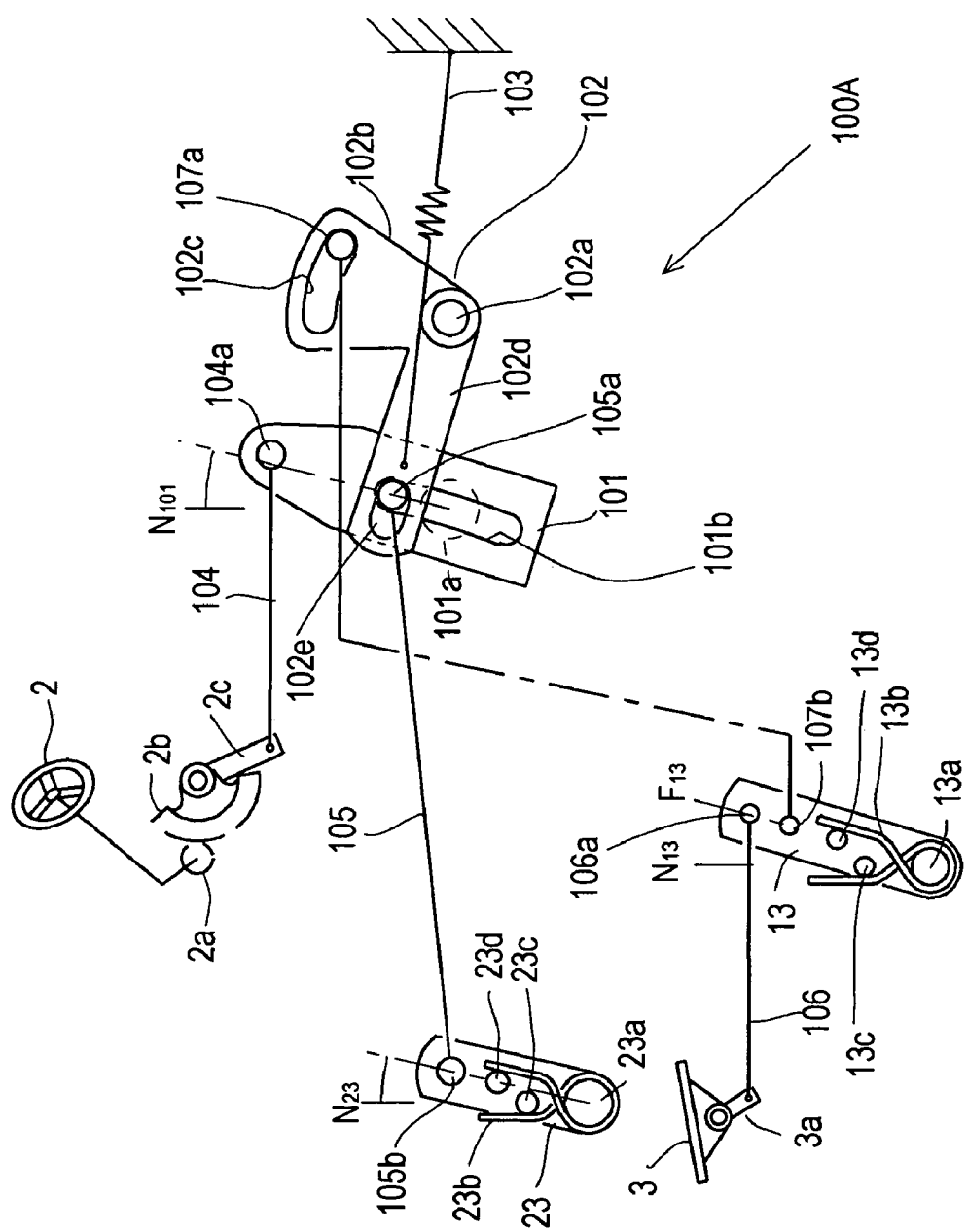
FIG. 3 is a structural diagram of displacement-control mechanism 100A when accelerator pedal 3 is depressed for forward traveling and steering wheel 2 is turned rightward.

As shown in FIG. 2 and FIG. 3, in the state that traveling-direction switching rotary plate 102 is disposed at the forward-traveling position, if accelerator pedal 3 and traveling-speed control lever 13 are returned to respective neutral positions $N_3$ and $N_{13}$, end pin 107a is disposed at the left end of slot 102c (neutral position $N_{107}$ shown in FIG. 2). Under this condition, if accelerator pedal 3 is depressed for backward traveling, an only little leftward turning of traveling-speed control lever 13 from neutral position $N_{13}$ forces end pin 107a at the left end of slot 102c to push first arm 102b leftward. Accordingly, second arm 102d is turned downward, and when second arm 102d passes the balance point, end pin 105a is instantaneously moved to the lower end of guide slot 101b by the overcenter action of spring 103, thereby setting traveling-direction switching rotary plate 102 into the backward-traveling position. In this way, the left end of slot 102c functions as a portion thrust by end pin 107a for setting traveling-direction switching rotary plate 102 to the backward-traveling position with the assist of the overcenter action of spring 103.

Figure 5:
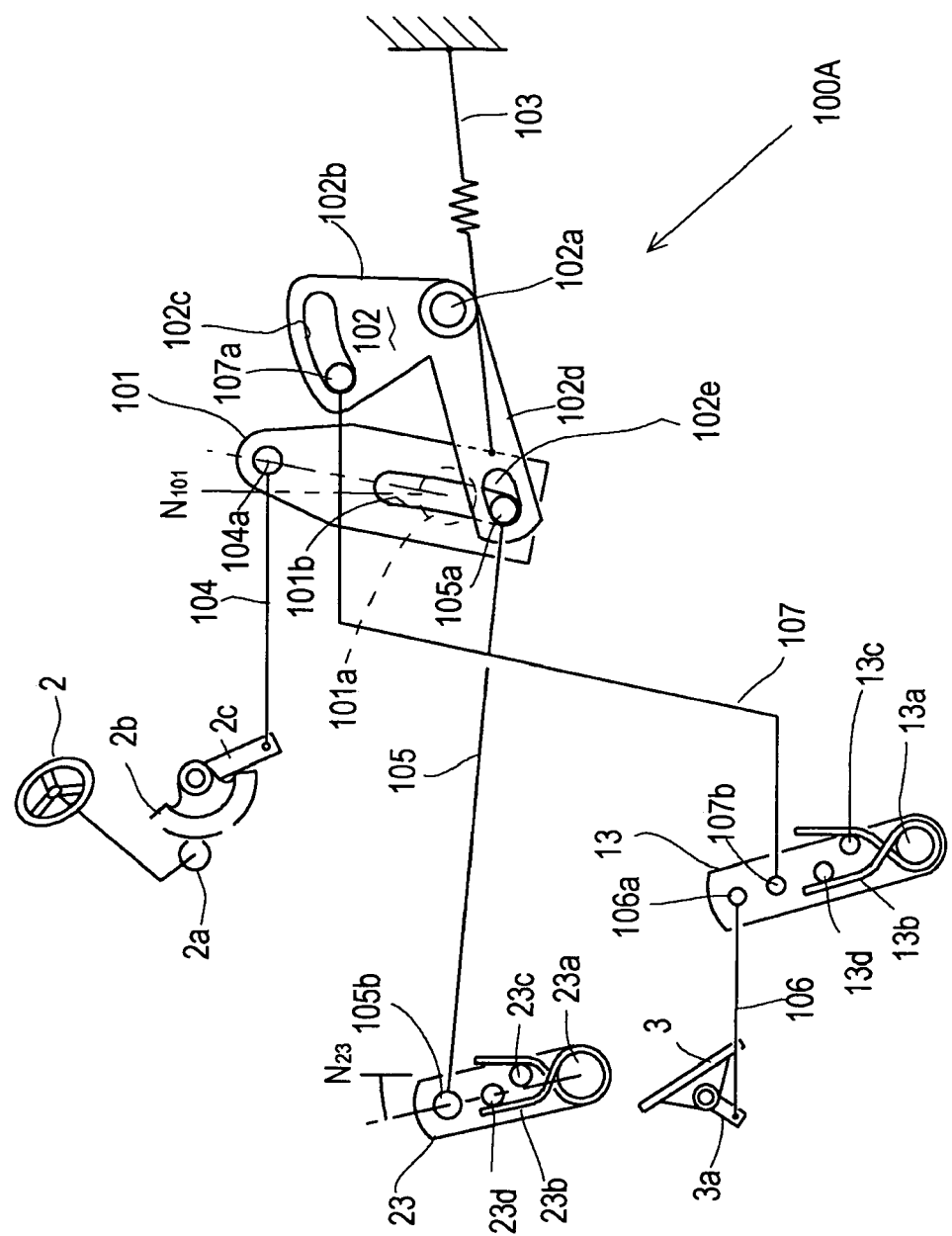
FIG. 5 is a structural diagram of displacement-control mechanism 100A when accelerator pedal 3 is depressed for backward traveling and steering wheel 2 is turned rightward.

On the other hand, as shown in FIG. 4 and FIG. 5, in the state that traveling-direction switching rotary plate 102 is disposed at the backward-traveling position, if accelerator pedal 3 and traveling-speed control lever 13 are returned to respective neutral positions $N_3$ and $N_{13}$, end pin 107a is disposed at the right end of slot 102c (neutral position $N_{107}$ shown in FIG. 4). Under this condition, if accelerator pedal 3 is depressed for forward traveling, an only little rightward turning of traveling-speed control lever 13 from neutral position $N_{13}$ forces end pin 107a at the right end of slot 102c to push first arm 102b rightward. Accordingly, second arm 102d is turned upward, and when second arm portion 102d passes the balance point, end pin 105a is instantaneously moved to the upper end of guide slot 101b by the overcenter action of spring 103, thereby setting traveling-direction switching rotary plate 102 into the forward-traveling position. In this way, the right end of slot 102c functions as a portion thrust by end pin 107a for setting traveling-direction switching rotary plate 102 to the forward-traveling position with the overcenter action of spring 103.

In this way, by changing the depression of accelerator pedal 3 between the front depressed portion for forward traveling and the rear depressed portion for backward traveling, traveling-direction switching rotary plate 102 is switched between the forward-traveling position and the backward-traveling position.

Steering-setting rotary plate 101 is turned (rotated) around pivotal shaft 101a by turning steering wheel 2. As shown in FIG. 2 and FIG. 4, while steering wheel 2 is held at a straight-traveling position (neutral position), steering-setting rotary plate 101 stays at a neutral position $N_{101}$. As shown in FIG. 3 and FIG. 5, if steering wheel 2 is turned rightward from the straight-traveling position, arm 2c is turned rightward integrally with sector gear 2b, so as to turn the upper end of steering-setting rotary plate 101 rightward from neutral position $N_{101}$ via link rod 104. Here, if traveling-direction switching rotary plate 102 is disposed at the forward-traveling position, that is, with respect to FIG. 3, if end pin 105a of link rod 105 is disposed at the upper end of guide slot 101b above pivotal shaft 101a, link rod 105 is pulled rightward and steering-speed control lever 23 is turned rightward from neutral position $N_{23}$. On the other hand, if traveling-direction switching rotary plate 102 is disposed at the backward-traveling position, that is, with respect to FIG. 5, if end pin 105a of link rod 105 is disposed at the lower end of guide slot 101b below pivotal shaft 101a, link rod 105 is pushed leftward and steering-speed control lever 23 is turned leftward from neutral position $N_{23}$.

If steering wheel 2 is turned leftward from the straight-traveling position, the upper end of steering-setting rotary plate 101 is turned leftward from neutral position $N_{101}$ via link rod 104. Here, if traveling-direction switching rotary plate 102 is disposed at the forward-traveling position, that is, if end pin 105a of link rod 105 is disposed at the upper end of guide slot 101b above pivotal shaft 101a, link rod 105 is pulled leftward and steering-speed control lever 23 is turned leftward from neutral position $N_{23}$. On the other hand, if traveling-direction switching rotary plate 102 is at the backward-traveling position, that is, if end pin 105a of link rod 105 is disposed at the lower end of guide slot 101b below pivotal shaft 101a, link rod 105 is pushed rightward and steering-speed control lever 23 is turned rightward from neutral position $N_{23}$.

FIG. 3 shows a state where accelerator pedal 3 is depressed for forward traveling, and FIG. 5 shows a state where accelerator pedal 3 is depressed backward, both states being under the condition that steering wheel 2 is turned rightward from the straight-traveling position. In FIG. 3, steering-speed control lever 23 is turned rightward from neutral position $N_{23}$. On the other hand, in FIG. 5, steering-speed control lever 23 is turned leftward from neutral position $N_{23}$. In the state shown in FIG. 3, traveling HST 10 drives axles 7L and 7R (see FIG. 1) forward, and steering HST 20 applies forward driving force to left axle 7L and backward driving force to right axle 7R, so as to accelerate left axle 7L and decelerate right axle 7R, thereby making a right turn of the vehicle. In the state shown in FIG. 5, traveling HST 10 drives axles 7L and 7R (see FIG. 1) backward, and steering HST 20 applies backward driving force to left axle 7L and forward driving force to right axle 7R, so as to accelerate left axle 7L and decelerate right axle 7R, thereby making a right turn of the vehicle. In this way, the vehicle turns right by rightward turning of steering wheel 2 from the straight-traveling position regardless of whether the vehicle travels forward or backward. Similarly, the vehicle turns left by leftward turning of steering wheel 2 from the straight-traveling position regardless of whether the vehicle travels forward or backward. In this way, a reverse logic linkage is established in displacement-control mechanism 100A.

As described above, in the reverse logic linkage, due to the overcenter action of spring 103, end pin 105a of link rod 105 is switched between the forward-traveling position and the backward-traveling position (traveling-direction switching rotary plate 102 is switched between the forward-traveling position and the backward-traveling position), and due to the biasing force of spring 103, end pin 105a is held at one of the two positions, so that, during the rotation of steering-setting rotary plate 101 by turning of steering wheel 2, the link ratio between steering wheel 2 and steering-speed control lever 23 through steering-setting rotary plate 101 and link rods 104 and 105 is kept constant, thereby ensuring a reliable and stable action of steering-speed control lever 23, i.e., movable swash plate 22 of steering HST 20 in response to the turning of the steering wheel 2.

When accelerator pedal 3 depressed for forward traveling is reset to the neutral position, traveling-direction switching rotary plate 102 still remains at the forward-traveling position as described above, so that the vehicle can make a right spin turn by turning steering wheel 2 rightward, and can make a left spin turn by turning steering wheel 2 leftward. On the other hand, if accelerator pedal 3 depressed for backward traveling is reset to the neutral position, traveling-direction switching rotary plate 102 still remains at the backward-traveling position, so that the vehicle can make a left spin turn by turning steering wheel 2 rightward, and can make a right spin turn by turning steering wheel 2 leftward. In this way, the vehicle can make a spin turn by turning steering wheel 2 while accelerator pedal 3 is disposed at the neutral position. However, the spin turn direction of the vehicle is opposite to the turning direction of steering wheel 2 because the turning direction of steering-speed control lever 23 depends on whether accelerator pedal 3 has been depressed for forward traveling or backward traveling just before it is reset to the neutral position.

The following displacement-control mechanisms 100B to 100G will be described on the assumption that, with respect to FIGS. 6, 11 and 16 to 23, similarly to traveling-speed control lever 13 and steering-speed control lever 23 shown in FIGS. 2 to 5 concerning displacement-control mechanism 100A, the top of traveling-speed control lever 13 or 213 is turned rightward from the neutral position so as to rotate traveling hydraulic motor 14 (motor shaft 15) for forward traveling, and tilted leftward from the neutral position so as to rotate traveling hydraulic motor 14 (motor shaft 15) for backward traveling, and steering-speed control lever 23 is tilted rightward from neutral position $N_{23}$ so as to rotate hydraulic motor 24 (motor shaft 25) for the right turn of the forward traveling vehicle and the left turn of the backward traveling vehicle, and turned leftward from neutral position $N_{23}$ so as to rotate hydraulic motor 24 (motor shaft 25) for the left turn of the forward traveling vehicle and the right turn of the backward traveling vehicle.

Figure 6:
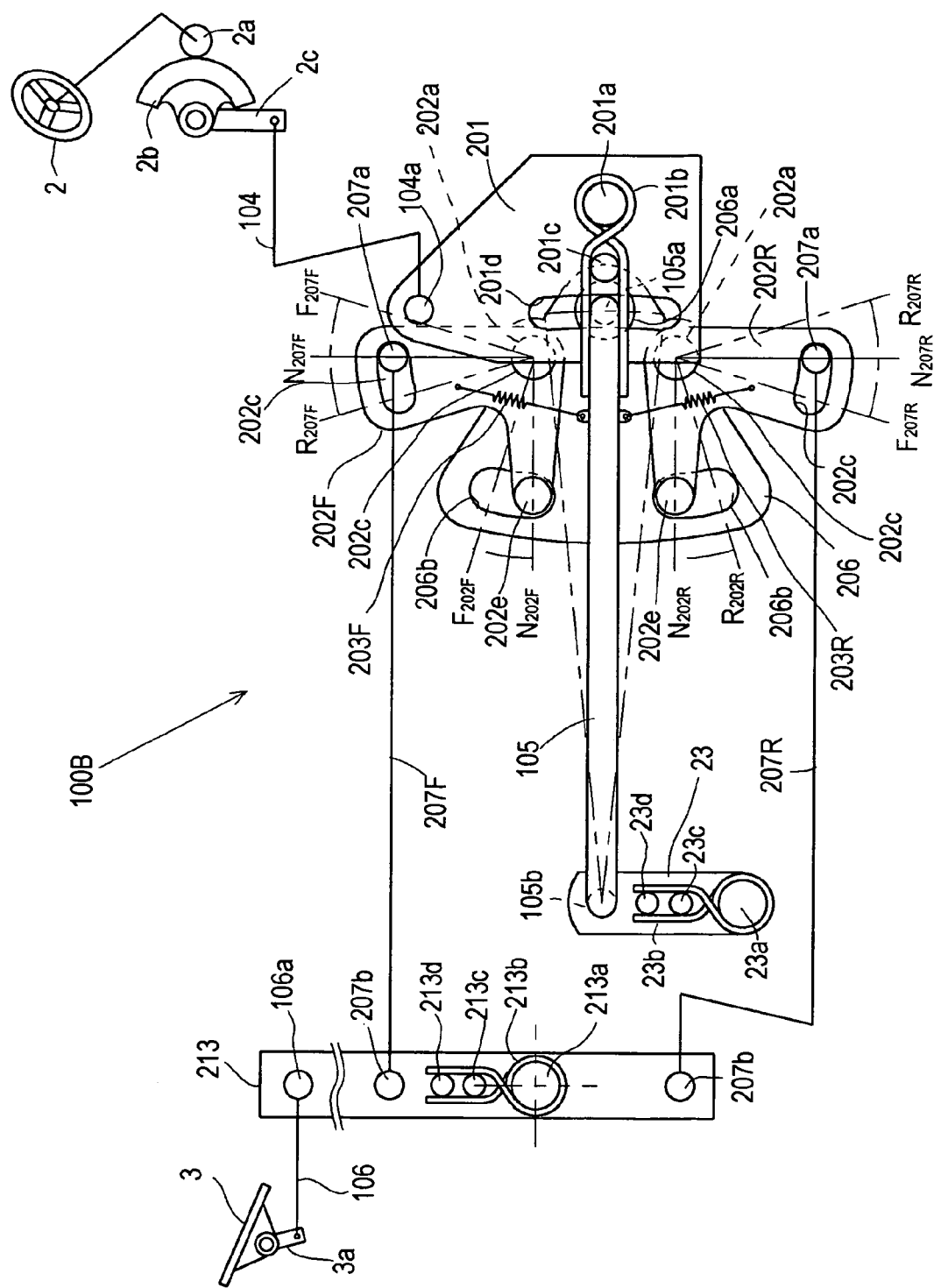
FIG. 6 is a structural diagram of a displacement-control mechanism 100B according to a second embodiment of the present invention, when accelerator pedal 3 and steering wheel 2 are disposed at respective neutral positions.
Figure 7:
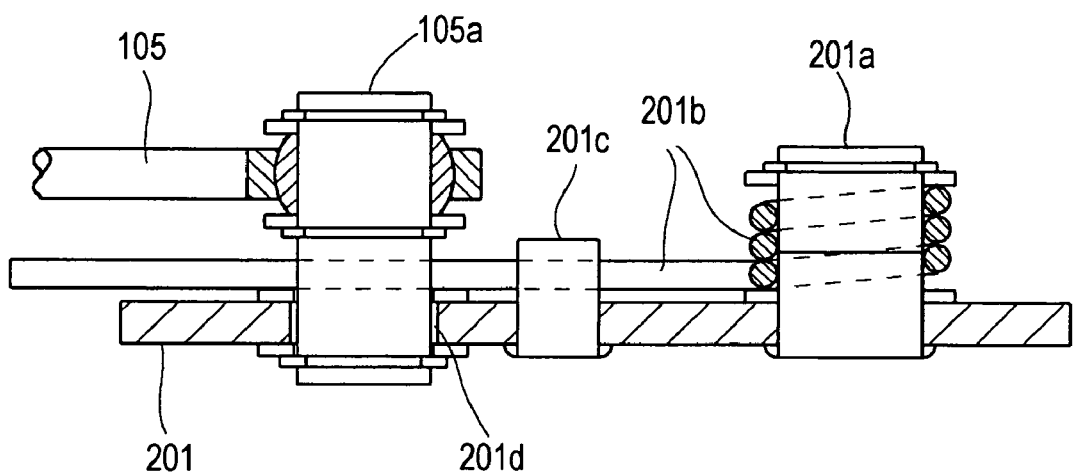
FIG. 7 is a sectional view of a steering-setting rotary plate 201 of displacement-control mechanism 100B with a neutral-returning device and a portion in which an end pin 105a of a steering link rod 105 is fitted.

Displacement-control mechanism 100B will be described with reference of FIGS. 6 to 8. As shown in FIG. 6, this mechanism uses a traveling-speed control lever 213 interlocked with accelerator pedal 3 and with movable swash plate 12 of traveling hydraulic pump 11. End pin 106a of link rod 106 extended from arm 3a of accelerator pedal 3 is pivoted on one end (in FIG. 6, a top end) of traveling-speed control lever 213. A pivotal shaft 213a pivots traveling-speed control lever 213. Respective end pins 207b of a pair of link rods 207F and 207R are pivoted onto opposite (in FIG. 6, upper and lower) portions of traveling-speed control lever 213 with respect to pivotal shaft 213a. Similar to traveling-speed control lever 13 having the neutral-returning mechanism, traveling-speed control lever 213 is provided with a neutral-returning spring 213b, a push pin 213d and a neutral-positioning pin 212c.

Link rod 104 extended from arm 2c of sector gear 2b interlocking with steering wheel 2 is pivotally connected through end pin 104a to a tip end of a steering-setting rotary plate 201. As shown in FIGS. 6 and 7, a pivotal shaft 201 pivots steering-setting rotary plate 201. A neutral-returning spring 201b is wound around pivotal shaft 201a, and has both end portions for pinching a pin 201c planted into steering-setting rotary plate 201 and end pin 105a of link rod 105 therebetween. Link rod 105 is pivotally connected to the rotational tip end of steering-speed control lever 23.

Steering-setting rotary plate 201 is formed with a guide slot 201d into which end pin 105a of link rod 105 is slidably fitted. End pin 105a of link rod 105 slides along slot 201d so as to rotate centered on end pin 105b on steering-speed control lever 23. Due to this sliding of end pin 105a, one end of neutral-returning spring 201b is pushed away from the other end thereof retained by pin 201c so as to generate force for biasing steering-setting rotary plate 201 toward the neutral position defined by pin 201d. While steering-setting rotary plate 201 is disposed at the neutral position, as shown in FIG. 6, end pin 105a of link rod 105 is disposed at the center position in guide slot 201d and on the axis of a fixture shaft 206a of a later-discussed fixed plate 206. Further, all axes of pivotal shaft 201a, pin 201c, end pin 105a and fixture shaft 206a are aligned in a straight line with respect to FIG. 6.

Figure 8:
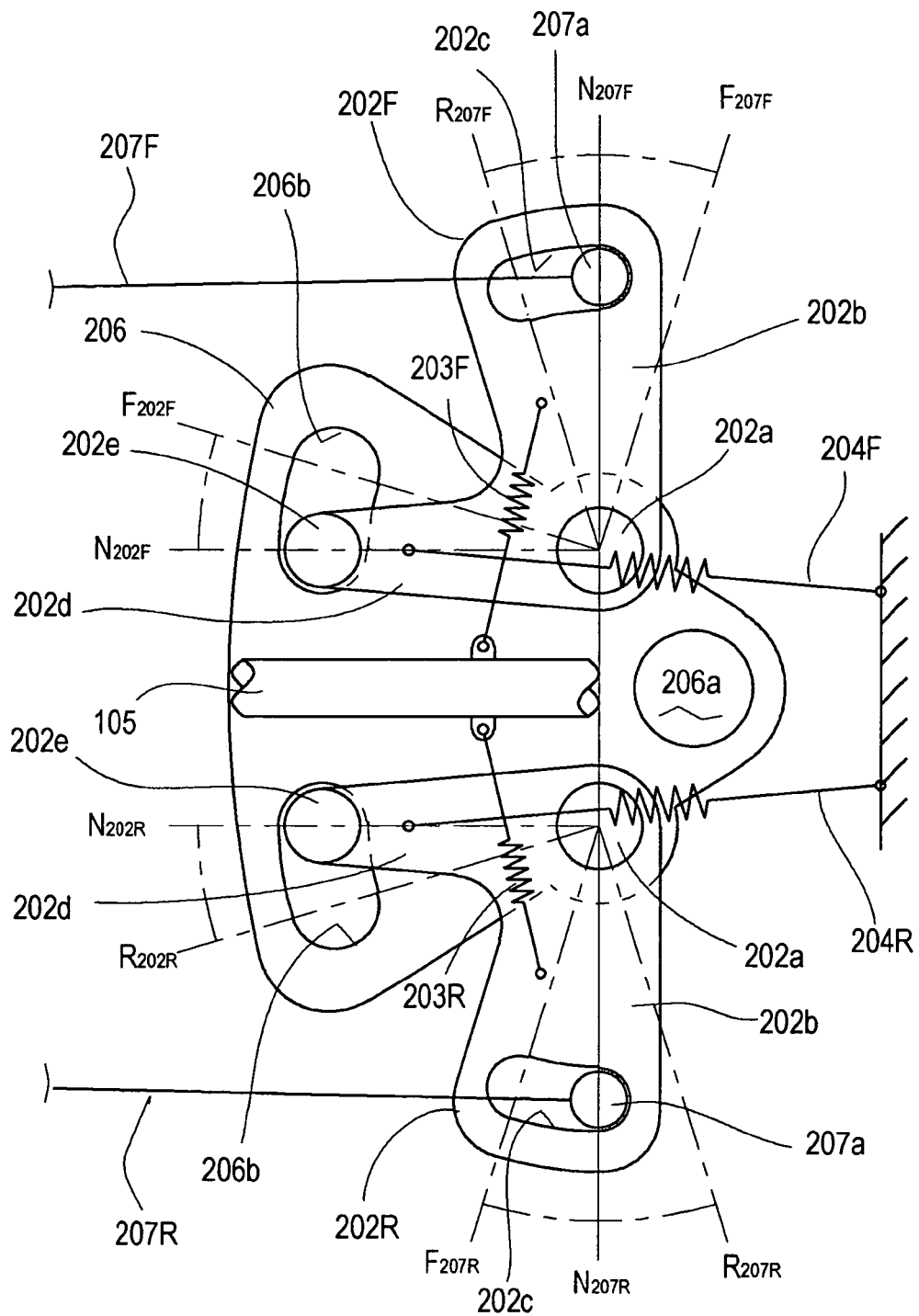
FIG. 8 is a structural diagram of a principal portion of displacement-control mechanism 100B.

As shown in FIGS. 6 and 8, a pair of rotary plates 202F and 202R are disposed symmetrically with respect to the axial line of link rod 105 disposed at the neutral position, where end pin 105a is disposed on the axis of fixture shaft 206b. Rotary plates 202F and 202R are pivotally connected to fixed plate 206 through respective pivotal shafts 202a. Fixed plate 206 is stationarily fixed on a vehicle through a fixture shaft 206a which is equally distant from both pivotal shafts 206a. The axis of fixture shaft 206a is defined as the neutral position of end pin 105a of link rod 105. The neutral position of end pin 105a may be defined by alternative means, so that fixed plate 206 can be stationarily fixed on a vehicle without fixture shaft 206a disposed at this position or with alternative means.

L-like shaped rotary plates 202F and 202R are provided at the bent portions thereof with respective pivotal shafts 202a. A first arm 202b and a second arm 202d are extended substantially perpendicular to each other from the bent portion of each of rotary plates 202F and 202R. As shown in FIG. 8, stretched springs 204F and 204R are pivoted at one ends thereof onto respective second arms 202d of rotary plates 202F and 202R, and stationarily fixed at the other ends thereof, so as to bias respective rotary plates 202F and 202R rightward. Rightward rotation of each of rotary plates 202F and 202R with respect to FIGS. 6 and 8 causes an overcenter action of corresponding stretched spring 204F or 204R.

As shown in FIGS. 6 and 8, each of first arms 202b is bored with a slot 202c along a tip edge thereof. End pin 207a of each of link rods 207F and 207R is slidably fitted in corresponding slot 202c.

Fixed plate 206 is bored with a pair of slots 206b, which are symmetric with respect to the axial line of link rod 105 disposed at the neutral position. An end pin 202e is provided on the tip portion of second arm 202d of each of rotary plates 202F and 202R, and slidably fitted in each of slots 206b.

Each of stretched springs 203F and 203R is interposed between link rod 105 and an intermediate portion of first arm 202b of each of rotary plates 202F and 202R. Ends of respective springs 203F and 203R to be pivotally connected to respective rotary plates 202F and 202R are disposed relatively rightward from ends of respective springs 203F and 203R to be pivotally connected to link rod 105 with respect to FIGS. 6 and 8. Rightward rotation of each of rotary plates 202F and 202R with respect to FIGS. 6 and 8 causes an overcenter action of corresponding stretched spring 203F or 203R.

In this regard, as shown in FIGS. 6 and 8, due to the overcenter action of springs 203F and 204F, forward-traveling-setting rotary plate 202F is switched between a neutral position $N_{202F}$ and a forward-traveling position $F_{202F}$ with respect to the position of end pin 202e thereof. Due to the overcenter action of springs 203R and 204R, backward-traveling-setting rotary plate 202R is switched between a neutral position $N_{202R}$ and a backward-traveling position $R_{202R}$ with respect to the position of end pin 202e thereof.

The length of slot 202c of forward-traveling-setting rotary plate 202F is determined so as to allow the movement of end pin 207a of link rod 207F from a neutral position $N_{207F}$ to a forward-maximum-speed position $F_{207F}$ corresponding to the whole forward-traveling speed setting stroke range of accelerator pedal 3 when rotary plate 202F is disposed at forward-traveling position $F_{202F}$, and so as to allow the movement of end pin 207a of link rod 207F from neutral position $N_{207F}$ to a backward-maximum-speed position $R_{207F}$ when rotary plate 202F is disposed at neutral position $N_{202F}$. The length of slot 202c of backward-traveling-setting rotary plate 202R is determined so as to allow the movement of end pin 207a of link rod 207R from a neutral position $N_{207R}$ to a backward-maximum-speed position $R_{207R}$ corresponding to the whole backward-traveling speed setting stroke range of accelerator pedal 3 when rotary plate 202R is disposed at backward-traveling position $R_{202R}$, and so as to allow the movement of end pin 207a of link rod 207R from neutral position $N_{207R}$ to a forward-maximum-speed position $F_{207R}$ when rotary plate 202R is disposed at neutral position $N_{202R}$.

The rotational force of forward-traveling-setting rotary plate 202F caused by the overcenter action of springs 203F and 204F, and the rotational force of backward-traveling-setting rotary plate 202R caused by the overcenter action of springs 203R and 204R exceed the force of neutral-returning spring 201b for holding link rod 105.

The action of displacement-control mechanism 100B constructed as the above will be described with reference to FIGS. 6 and 8. As shown in FIG. 6, when steering wheel 2 and accelerator pedal 3 are disposed at their neutral positions, due to the biasing force of springs 203F and 203R and springs 204F and 204R, end pins 202e of rotary plates 202F and 202R are disposed at respective neutral positions $N_{202F}$ and $N_{202R}$ in their rotational directions along respective slots 206a centered on respective pivotal shafts 202a, i.e., at the ends of respective slots 206a toward link rod 105. End pin 105a of link rod 105 is disposed at the center position in guide slot 201d on the axis of fixture shaft 206b. End pins 207a of link rods 207F and 207R extended rightward from traveling-speed control lever 213 are disposed at respective neutral positions $N_{207F}$ and $N_{207R}$ in their rotational directions along respective slots 202c centered on respective pivotal shafts 202a, i.e., at the right ends of respective slots 202c.

When steering wheel 2 starts turning from the neutral (straight traveling) position, steering-setting rotary plate 201 is intended to rotate centered on pivotal shaft 201a. However, guide slot 201d is formed so as to guide the rotation of end pin 105a of link rod 105 centered on end pin 105b. Even if the rotation of steering-speed control lever 23 is considered, the rotational direction of end pin 105a does not coincide with a rotational direction of steering-setting rotary plate 201 centered on pivotal shaft 201a, thereby causing relative twisting of steering-setting rotary plate 201 and end pin 105a. Therefore, steering-setting rotary plate 201 cannot be rotated. In this way, even if an unexpected force is applied onto steering wheel 2 in the state that accelerator pedal 3 is disposed at the neutral position as shown in FIG. 6 (in the neutral state of traveling HST 10), steering wheel 2 is prevented from rotating from the straight traveling position, thereby preventing unexpected spin turn of the vehicle.

With respect to FIG. 6, when accelerator pedal is depressed for forward traveling, arm 3a is rotated rightward, the top of traveling-speed control lever 213 is rotated rightward, and the lower end of traveling-speed control lever 213 is rotated leftward. Link rod 207F moves rightward because end pin 207b of link rod 207F is disposed above pivotal shaft 213a, similarly to end pin 106a of link rod 106 extended from arm 3a. Accordingly, end pin 207a abutting against the right end of slot 202c rotates first arm 202b of forward-traveling-setting rotary plate 202F rightward, and second arm 202d upward. According to the rotation of second arm 202d, end pin 202e at the tip of second arm 202d slides in slot 206a. Finally, springs 203F and 204F perform the overcenter action against the force of neutral-returning spring 201b, so that end pin 105a instantaneously reaches the upper end of guide slot 201d, and end pin 202e instantaneously reaches (upper) end $F_{207F}$ of slot 206b opposite to link rod 105. In this way, forward-traveling setting rotary plate 202F (with end pin 202e) is disposed at forward-traveling position $F_{202F}$. End pin 207a of link rod 207F is held at a position in slot 202c corresponding to the depression degree of accelerator pedal 3 for forward traveling, regardless of the rotation of forward-traveling-setting rotary plate 202F from neutral position $N_{202F}$ to forward-traveling position $F_{202F}$.

On the other hand, link rod 207R disposed below pivotal shaft 212b moves leftward, so that end pin 207a of link rod 207R merely slides in slot 202c of backward-traveling-setting rotary plate 202R remaining at neutral position $N_{202R}$.

With respect to FIG. 6, when steering wheel 2 is turned leftward in this situation, the top of steering-setting rotary plate 201 moves leftward so as to leftwardly move the top end of guide slot 201d above pivotal shaft 201a. Accordingly, link rod 105 with end pin 105a disposed at the top end of guide slot 201d is pushed leftward so as to turn steering-speed control lever 23 leftward from the neutral position. Due to turning of movable swash plate 22 in correspondence to the leftward turning of steering-speed control lever 23, steering hydraulic motor 24 is driven to decelerate forwardly rotating left axle 7L and accelerate forwardly rotating right axle 7R, thereby making left turn of the vehicle.

On the contrary, with respect to FIG. 6, when steering wheel 2 is turned rightward from the straight traveling position during forward traveling, the top of steering-setting rotary plate 201 moves rightward so as to rightwardly push link rod 105 through end pin 105a disposed at the top end of guide slot 201d, thereby turning steering-speed control lever 23 rightward from the neutral position. Due to turning of movable swash plate 22 in correspondence to the rightward turning of steering-speed control lever 23, steering hydraulic motor 24 is driven to accelerate forwardly rotating left axle 7L and decelerate forwardly rotating right axle 7R, thereby making right turn of the vehicle.

When depressed accelerator pedal 3 for forward traveling is returned to the neutral position, forward-traveling-setting rotary plate 202F is stationary, so that end pin 207a of link rod 207 moves from the right end to the left end in slot 202c of stationary forward-traveling-setting rotary plate 202F. If returned accelerator pedal 3 is disposed at the neutral position, steering wheel 2 can be turned for making a spin turn of the vehicle. If the depression of accelerator pedal 3 is shifted to the direction for backward traveling, forward-traveling-setting rotary plate 202F is pulled by end pin 207a disposed at the left end of slot 202c so as to rotate leftward. Finally, end pin 202e of forward-traveling-setting rotary plate 202F returns to neutral position $N_{202F}$ by the overcenter action of springs 203F and 204F and by the biasing force of spring 201b. Therefore, end pin 105a of link rod 105 returns to the neutral position on the axis of fixture shaft 206a, thereby preventing the spin turn of the vehicle.

If accelerator pedal 3 is further depressed for backward traveling, link rod 207R moves rightward so as to push backward-traveling-setting rotary plate 202R rightward. Finally, springs 203R and 204R perform the overcenter action against the force of neutral-returning spring 201b, so that, with respect to FIG. 6, end pin 105a of link rod 105 instantaneously reaches the lower end of guide slot 201d, and end pin 202e of backward-traveling-setting rotary plate 202 instantaneously reaches a backward-traveling position $R_{202R}$ at the (lower) end of slot 206b opposite to link rod 105. At this time, end pin 207a of link rod 207R is held at a position in slot 202c corresponding to the depression degree of accelerator pedal 3 for backward traveling, regardless of the rotation of backward-traveling-setting rotary plate 202R from neutral position $N_{202R}$ to backward-traveling position $R_{202R}$.

During the depression of accelerator pedal 3 for backward traveling, link rod 207F above pivotal shaft 212b moves leftward, so that end pin 207a of link rod 207F merely slides in slot 202c of forward-traveling-setting rotary plate 202F with end pin 202e remaining at neutral position $N_{202F}$.

When steering wheel 2 is turned leftward in this situation, with respect to FIG. 6, the top end of steering-setting rotary plate 201 is rotated leftward, and the bottom end of guide slot 201d below pivotal shaft 201a moves rightward. Accordingly, link rod 105 with end pin 105a disposed at the lower end of guide slot 201d is pushed rightward so as to rotate steering-speed control lever 23 rightward from the neutral position. Movable swash plate 22 of steering hydraulic motor 24 is turned in correspondence to the rightward turning of speed-speed control lever 23 so as to decelerate backwardly rotating left axle 7L, and to accelerate backwardly rotating right axle 7R, thereby making a left turn of the vehicle.

When steering wheel 2 is turned rightward during backward traveling, with respect to FIG. 6, the top end of steering-setting rotary plate 201 rotates rightward and pushes link rod 105 leftward through end pin 105a disposed at the lower end of guide slot 201d so as to rotate steering-speed control lever 23 leftward from the neutral position. Movable swash plate 22 of steering hydraulic motor 24 is turned in correspondence to the leftward turning of speed-speed control lever 23 so that steering hydraulic motor 24 accelerates backwardly rotating left axle 7L, and decelerates backwardly rotating right axle 7R, thereby making a right turn of the vehicle.

When end pin 105a of link rod 105 is disposed at the lower end of slot 201b, and accelerator pedal 3 depressed for backward traveling is returned to the neutral position, backward-traveling-setting rotary plate 202R still remains at backward-traveling position $R_{202R}$, i.e., end pin 105a still remains at the lower end of slot 201b, thereby enabling a spin turn of the vehicle. However, during the spin turn in this situation, the turning direction of steering wheel 2 is opposite to the turning direction of the vehicle.

Figure 9:
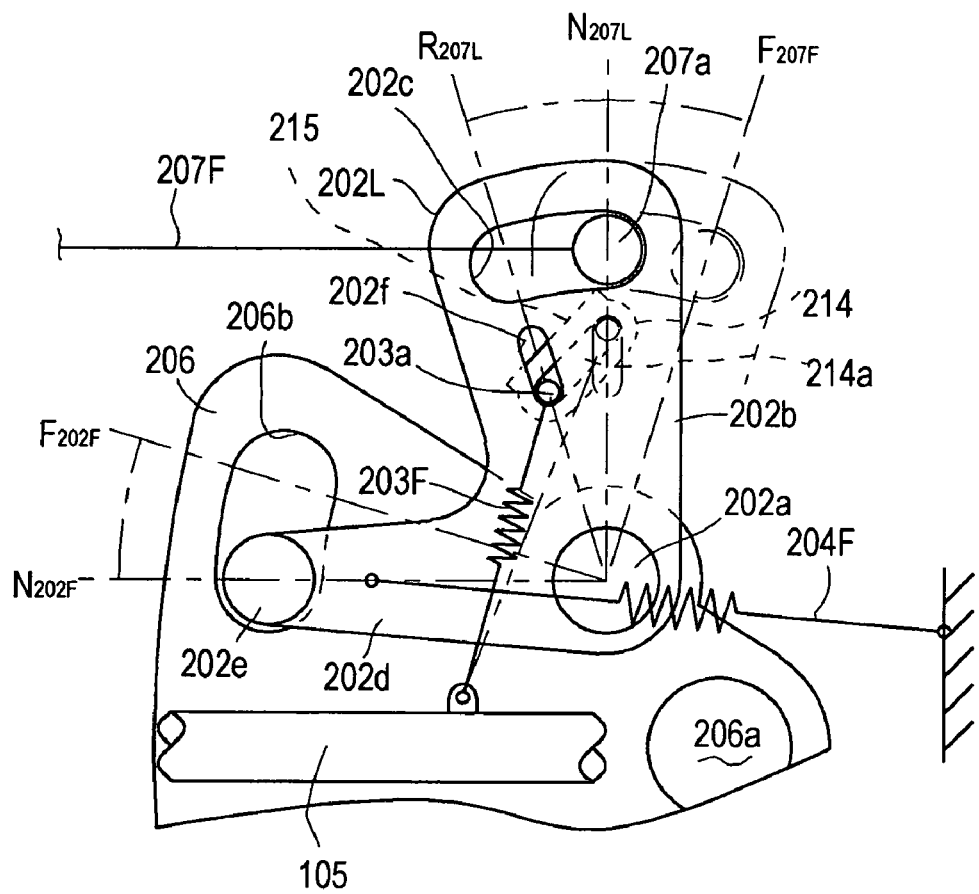
FIG. 9 is a structural diagram of the principal portion of displacement-control mechanism 100B, optimizing attachment of springs 203F and 203R to respective rotary plates 202F and 202R.
Figure 10:
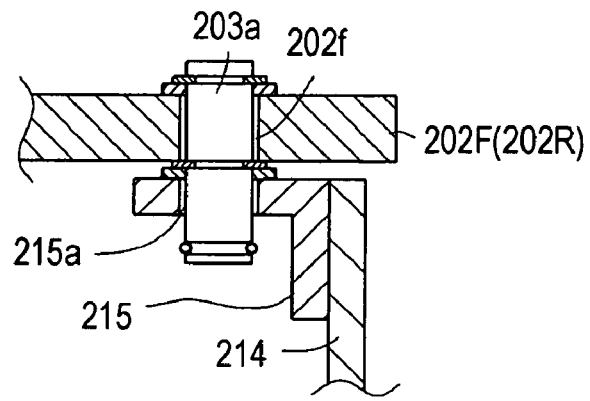
FIG. 10 is a sectional view of the principal portion of displacement-control mechanism 100B of FIG. 9.

In displacement-control mechanism 100B constructed as the above, springs 203F and 203R may alternatively be connected to rotary plates 202F and 202R as shown in FIGS. 9 and 10, which shows only representative connection of spring 203F to rotary plate 202F. In this regard, each of first arms 202b of rotary pates 202F and 202R is formed with a slot 202f extended in the radial direction of first arm 202b centered on the axis of pivotal shaft 202a. End pins 203a of springs 203F and 203R extended from link rod 105 are slidably fitted in respective slots 202f.

When each of rotary plates 202F and 202R is disposed at corresponding neutral position $N_{202F}$ or $N_{202R}$ as shown in FIG. 6 (it should be noticed that forward-traveling-setting rotary plate 202F during the setting of backward traveling is still disposed at neutral position $N_{202F}$, and backward-traveling-setting rotary plate 202R during the setting of forward traveling is still disposed at neutral position $N_{202R}$), end pin 203a of corresponding spring 203F or 203R is pulled by link rod 105 and disposed at one end of slot 202f toward pivotal shaft 202a. When rotary plate 202F (represented as either rotary plate 202F or 202R) is turned rightward with respect to FIGS. 6, 8 and 9, spring 204F performs the overcenter action so as to generate a biasing force for rightwardly rotating forward-traveling-setting rotary plate 202F, i.e., for pulling link rod 105 toward the upper forward-traveling-setting position (for pulling end pin 105a toward the upper end of slot 201d). However, in this situation, if end pin 203a of spring 203F were fixed on second arm 202b, spring 203F would be compressed so as to resist link rod 105. Slot 202f is provided for preventing the resistance of spring 203F, and for smoothly moving link rod 105 to the forward-traveling-setting position. In this regard, during the rightward rotation of forward-traveling-setting rotary plate 202F, end pin 203a moves along slot 202f to the other end of slot 202f opposite to pivotal shaft 206a so as to restrain increase of the biasing force of spring 203F.

Incidentally, a stay 215 is stationarily fixed on a vehicle, and a guide member 214 is fixed on stay 215. Guide member 214 is formed with a guide slot 214a, into which end pin 203a fitted in slot 202f is also slidably fitted. Guide slot 214a is extended in the movement direction of end pin 203a between the opposite ends of slot 202f during the above-mentioned rightward turning of corresponding rotary plate 202F or 202R. Due to guide slot 214a, end pin 203a of each of springs 203F and 203R can smoothly move in slot 202f of corresponding rotary plate 202F or 202R.

Figure 11:
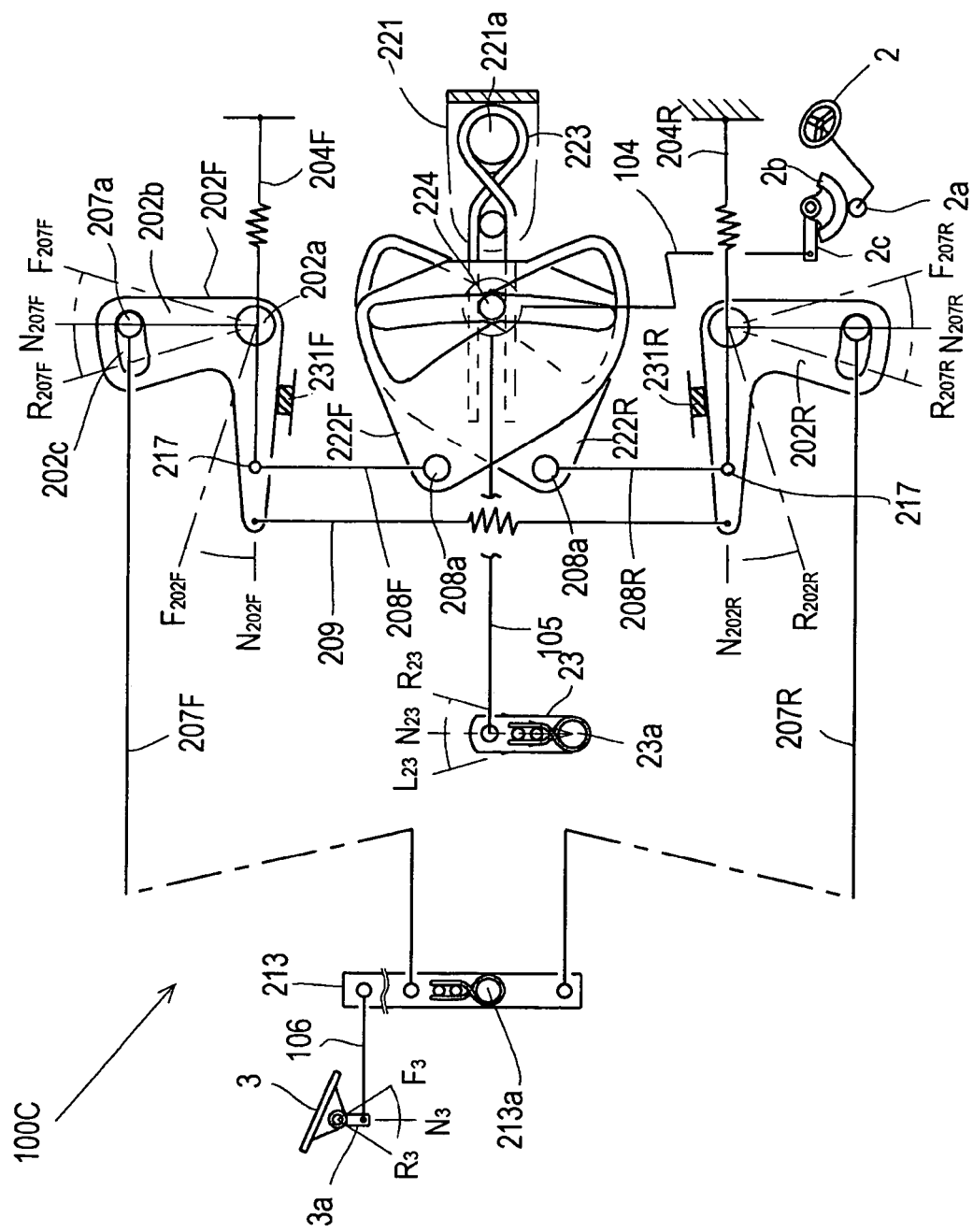
FIG. 11 is a structural diagram of a displacement-control mechanism 100C according to a third embodiment of the present invention, when accelerator pedal 3 and steering wheel 2 are disposed at respective neutral positions.

Displacement-control mechanism 100C will now be described with reference to FIGS. 11 to 15. As shown in FIG. 11, similar to displacement-control mechanism 100B, displacement-control mechanism 100C comprises: traveling-speed control lever 213 interlocking with accelerator pedal 3; link rods 207F and 207R extended from traveling-speed control lever 213; rotary plates 202F and 202R relatively slidably fitting respective end pins 207a of link rods 207F and 207R; springs 204L and 204R for retaining respective rotary plates 202F and 202R at the set positions, steering-speed control lever 23; and link rod 105 having end pin 105b pivoted on the rotational end of steering-speed control lever 23.

As shown in FIG. 11, similar to link rods 207F and 207R and springs 204L and 204R in displacement-control mechanism 100B, each of link rods 207F and 207R has end pin 207a fitted in slot 202c formed in first arm 202b of corresponding rotary plate 202F or 202R, and each of springs 204L and 204R has end pin 217 pivoted on an intermediate portion of second arm 202d of corresponding rotary plate 202F and 202R.

As shown in FIG. 11, similar to rotary plates 202F and 202R of displacement-control mechanism 100B, rotary plates 202F and 202R of displacement-control mechanism 100C can be switched between neutral position $N_{202F}$ and forward-traveling position $F_{202F}$, and between neutral positions $N_{202R}$ and backward-traveling position $R_{202R}$, respectively, with respect to the positions of respective tip ends of second arms 202d. Additionally, a spring 209 is interposed between the tip ends of second arms 202d of rotary plates 202F and 202R, so as to bias both rotary plates 202F and 202R toward respective neutral positions $N_{202F}$ and $N_{202R}$. On the other hand, stoppers 231F and 231R are disposed as shown in FIG. 11, so that backward-traveling-setting rotary plate 202R abuts against corresponding stopper 231R so as to be retained at neutral position $N_{202R}$ during the turning of forward-traveling-setting rotary plate 202F to forward-traveling position $F_{202F}$, and that forward-traveling-setting rotary plate 202F abuts against corresponding stopper 231F so as to be retained at neutral position $N_{202F}$ during the turning of backward-traveling-setting rotary plate 202R to backward-traveling position $R_{202R}$.

Figure 12:
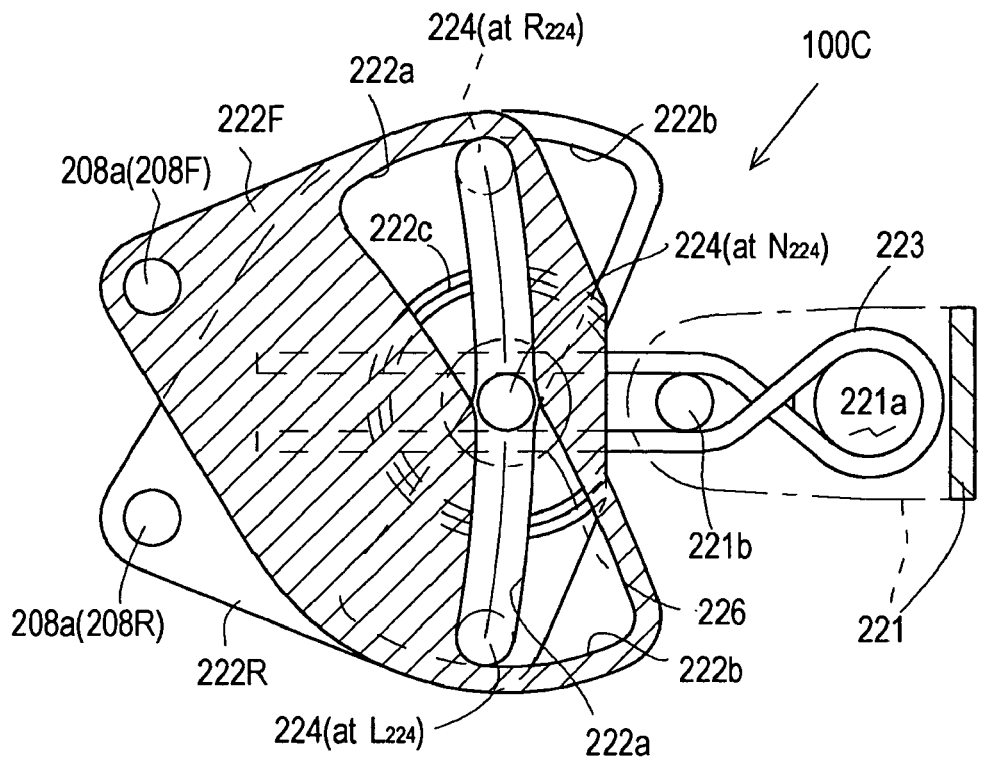
FIG. 12 is a partly sectional view of cam plates 222F and 222R of displacement-control mechanism 100C when accelerator pedal 3 is disposed at the neutral position.

A base plate 220, shown in FIG. 12, is stationarily fixed with respect to a vehicle, and an L-like bent stay 221 projects perpendicularly from base plate 220, and is extended at a portion thereof between the bent corner and the tip end in parallel to base plate 220. On the plate portion of stay 221 extended in parallel to base plate 220 are fixed a pivotal shaft 221a extended perpendicular to the plate portion of stay 221, and a neutral-positioning pin 221b extended in parallel to pivotal shaft 221a. A neutral-returning spring 223 is wound around pivotal shaft 221a. Both ends of neutral-returning spring 223 are twisted, cross each other, and are extended so as to pinch neutral-positioning pin 221b.

Base plate 220 is provided with a pivotal shaft 226 extended in parallel to pivotal shaft 221a. A backward-traveling-setting cam plate 222R is fixed onto pivotal shaft 226 through a bracket 225, and extended in parallel to base plate 220. Cam plate 222R is rotatable around the axis of pivotal shaft 226. A link rod 208R has end pins 217 and 208a at opposite ends thereof. End pin 217 of link rod 208R is pivoted on an intermediate portion of second arm 202d of backward-traveling-setting rotary plate 202R, and end pin 208a of link rod 208R is pivoted on a tip end of backward-traveling-setting cam plate 222R.

Figure 13:
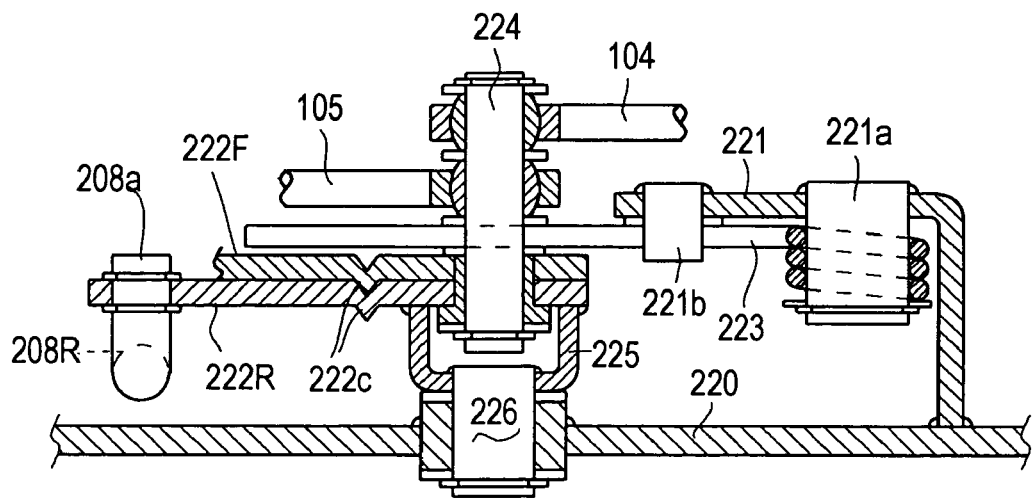
FIG. 13 is a sectional view of cam plates 222F and 222R when viewed perpendicular to the viewing direction of FIG. 12, with a neutral-returning device and a portion in which a common end pin 224 of link rods 104 and 105 is fitted.
Figure 14:
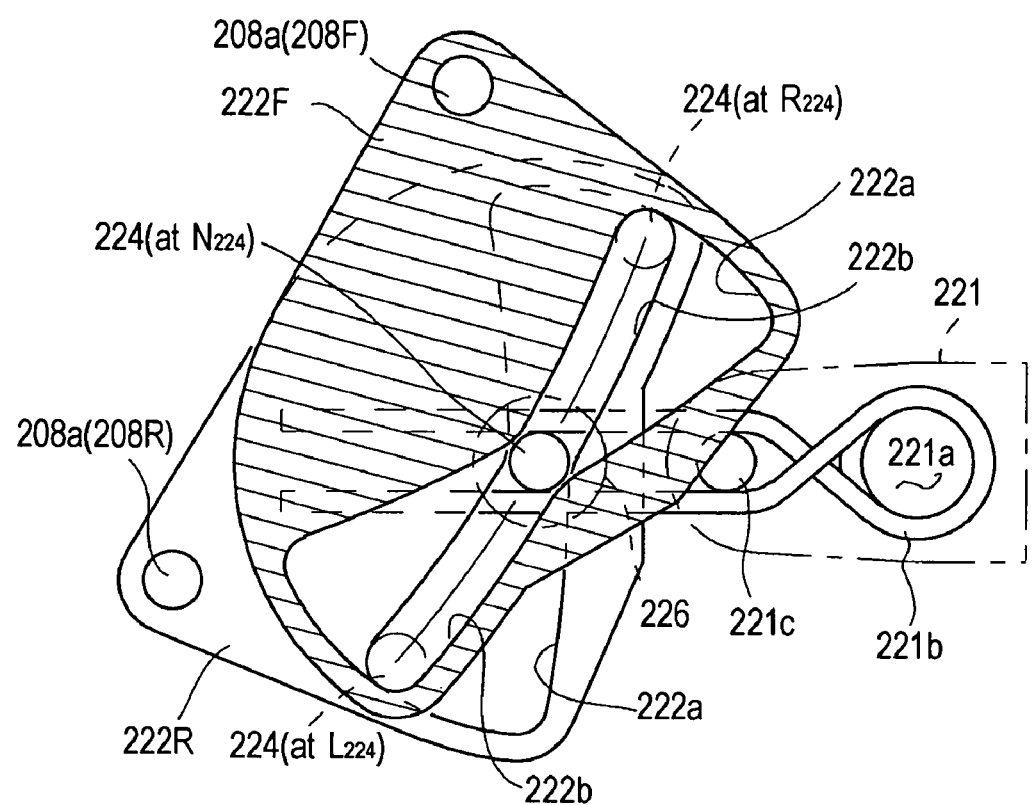
FIG. 14 is a partly sectional view of cam plates 222F and 222R of displacement-control mechanism 100C when accelerator pedal 3 is depressed for forward traveling.
Figure 15:
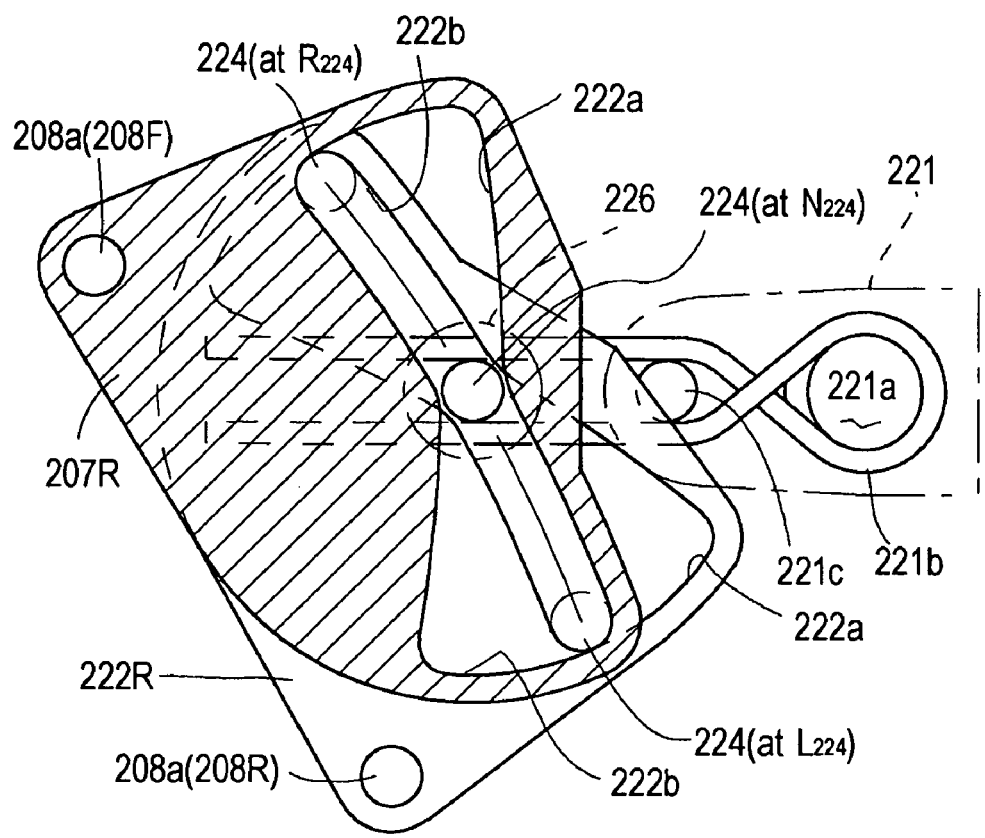
FIG. 15 is a partly sectional view of cam plates 222F and 222R of displacement-control mechanism 100C when accelerator pedal 3 is depressed for backward traveling.

With respect to FIG. 13, a forward-traveling-setting cam plate 222F is slidably fitted at the lower surface thereof onto the upper surface of backward-traveling-setting cam plate 222R. As shown in FIGS. 12, 14 and 15, each of cam plates 222F and 222R has a sectionally V-shaped guide groove 222c, which is arcuate centered on pivotal shaft 226. Each of cam plates 222F and 222R is pressed to be bent so as to form sectionally V-shaped groove 222c. With respect to FIG. 13, the bottom portion of groove 222c projects in a V-like shape downward from the lower surface of corresponding cam plate 22F or 222R, and the bottom end of V-shaped groove 222c of upper forward-traveling-setting cam plate 222F is slidably fitted into guide groove 222c of lower backward-traveling-setting cam plate 222R, so that cam plates 222F and 222R are rotatable relative to each other centered on pivotal shaft 226.

A link rod 208F has end pins 217 and 208a at opposite ends thereof. End pin 217 of link rod 208F is pivoted on an intermediate portion of second arm 202d of forward-traveling-setting rotary plate 202F, and end pin 208a of link rod 208F is pivoted on a tip end of forward-traveling-setting cam plate 222F.

With respect to FIGS. 12, 14 and 15, cam plates 222F and 222R fit each other so that they are disposed and shaped symmetrically with respect to a straight line, which is extended through the axis of pivotal shaft 226 and equally distanced from opposite end pins 208a and 208a.

With respect to FIGS. 12, 14 and 15, each of cam plates 222F and 222R is formed with a pair of substantially triangularly expanded guide holes 222a and 222b which are joined to each other at the axis of pivotal shaft 226 so as to be disposed upward and downward symmetrically with respect to the axis of pivotal shaft 226. In each of cam plates 222F and 222R, the substantially triangular shapes of guide holes 222a and 222b are narrowed as approaching the axis of pivotal shaft 226, so that the axis of pivotal shaft 226 is disposed through the narrowest junction portion between guide holes 222a and 222b.

In each of cam plates 222F and 222R, the substantially triangular expansion of guide hole 222a is directed toward corresponding end pin 208a, and the substantially triangular expansion of guide hole 222b is directed away from corresponding end pin 208a. With respect to FIGS. 12, 14 and 15, in each of the upper and lower regions about pivotal shaft 226, guide hole 222a or 222b of cam plate 222F is partly overlapped with guide hole 222b or 222a of cam plate 222R, so that the overlapping arcuate hole part between guide holes 222a and 222b serves as a guide slot for guiding rotation of an end pin 224 of link rod 105 centered on end pin 105b on the tip of steering-speed control lever 23 (see FIG. 11).

End pin 224 is disposed between both end portions of a neutral-returning spring 223 so as to be biased toward a neutral position $N_{224}$ on the axis of pivotal shaft 226, as shown in FIGS. 12, 14 and 15, by cooperation of neutral-returning spring 223 and neutral-positioning pin 221b. In this regard, while end pin 224 slides along the guide slot from neutral position $N_{224}$, neutral-returning spring 223 is retained at one end thereof by neutral-positioning pin 221b, and pushed out at the other end thereof by end pin 224 so as to generate a force biasing end pin 224 toward the axis of pivotal shaft 226.

Link rod 104 is extended from arm 2c of sector gear 2b meshing with pinion 2a of steering wheel 2, and also pivoted at an end thereof on end pin 224, so that the sliding of end pin 224 in the guide slot formed by guide holes 222a and 222b of cam plates 222F and 222R depends on turning of steering wheel 2. Link rods 104 and 105 are pivotally connected to end pin 224 substantially perpendicularly to each other, as shown in FIG. 11.

When steering wheel 2 is disposed at the straight traveling position, end pin 224 is disposed at neutral position $N_{224}$ on the axis of pivotal shaft 226. When steering wheel 2 is turned leftward from the straight traveling position, with respect to FIG. 11, link rod 104 is pulled downward so that guide pin 224 moves downward along the guide slot of cam plates 222F and 222R lower than pivotal shaft 226. When steering wheel 2 is turned rightward from the straight traveling position, with respect to FIG. 11, link rod 104 is pushed upward so that guide pin 224 moves upward along the guide slot higher than pivotal shaft 226. With respect to FIGS. 12, 14 and 15, the upper end of the guide slot formed of cam plates 222F and 222R is defined as a right steering limit position $R_{224}$ of end pin 224 corresponding to the full rightward turning position of steering wheel 2, and the lower end of the guide slot is defined as a left steering limit position $L_{224}$ of end pin 224 corresponding to the full leftward turning position of steering wheel 2.

Due to the depression state of accelerator pedal 3, the relative positional state of cam plates 222F and 222R is switched among three states, i.e., a neutral state shown in FIG. 12, a forward traveling state shown in FIG. 14, and a backward traveling state shown in FIG. 15. Unless accelerator pedal 3 is depressed (i.e., when accelerator pedal 3 is disposed at the neutral position), cam plates 222F and 222R are put in the neutral state. When accelerator pedal 3 is depressed for forward traveling, cam plates 222F and 222R are put into the forward traveling state. When accelerator pedal 3 is depressed for backward traveling, cam plates 222F and 222R are put into the backward traveling state.

In the neutral state shown in FIG. 12, upper and lower end pins 208a of cam plates 222F and 222R are disposed symmetrically with respect to the straight line passing the axes of pivotal shaft 221a, neutral-positioning pin 221c and pivotal shaft 226. In FIG. 12, the upper range of the guide slot for guiding end pin 224 above pivotal shaft 226 is formed between the right edge of guide hole 222*a* of forward-traveling-setting cam plate 222F and the left edge of guide hole 222*b* of backward-traveling-setting cam plate 222R, and the lower range of the guide slot for guiding end pin 224 below pivotal shaft 226 is formed between the left edge of guide hole 222*b* of forward-traveling-setting cam plate 222F and the right edge of guide hole 222*a* of backward-traveling-setting cam plate 222R.

With respect to FIG. 12, the arcuate guide slot for end pin 224 formed by cam plates 222F and 222R has a curvature which coincides with the curvature of rotational locus of the end of link rod 105 centered on opposite end pin 105*b*. Consequently, while end pin 224 slides along the guide slot formed by cam plates 222F and 222R in the neutral state, end pin 105*b* is stationary so as to hold steering-speed control lever 23 at neutral position $N_{23}$. Namely, even if steering wheel 2 is turned from the straight traveling position, the spin turn of the vehicle is prevented while accelerator pedal 3 is disposed at the neutral position.

The variation of the positional relation between rotary plates 202F and 202R depending on depression of accelerator pedal 3 and on the overcenter action of springs 204F and 204R is the same as that about displacement-control mechanism 100B. When accelerator pedal 3 is depressed for forward traveling, backward-traveling-setting rotary plate 202R is kept stationary at neutral position $N_{202R}$, and due to the overcenter action of spring 204F, forward-traveling-setting rotary plate 202F turns rightward with respect to FIG. 11 and reaches forward-traveling position $F_{202F}$. Consequently, while backward-traveling-setting cam plate 222R stays at the initial position, link rod 208F is pulled upward by the rightward turning of forward-traveling-setting rotary plate 202F so as to rotate forward-traveling-setting cam plate 222F upwardly rightward against neutral-returning spring 221*b*. In this way, cam plates 222F and 222R are put into the forward traveling state shown in FIG. 14. In this state, the upper range of the guide slot for guiding end pin 224 above pivotal shaft 226 is formed between the left edge of guide hole 222*a* of forward-traveling-setting cam plate 222F and the right edge of guide hole 222*b* of backward-traveling-setting cam plate 222R, and the lower range of the guide slot for guiding end pin 224 below pivotal shaft 226 is formed between the right edge of guide hole 222*b* of forward-traveling-setting cam plate 222F and the left edge of guide hole 222*a* of backward-traveling-setting cam plate 222R, so that the whole guide slot is slanted upwardly rightward.

In this state, when steering wheel 2 is turned leftward from the straight traveling position, end pin 224 slides along the guide slot toward the lower left end of the guide slot from neutral position $N_{224}$ so as to turn steering-speed control lever 23 leftward from neutral position $N_{23}$, so that hydraulic motor 24 decelerates forwardly rotating left axle 7L and accelerates forwardly rotating right axle 7R, thereby making a left turn of the forwardly traveling vehicle. When end pin 224 reaches left steering limit position $L_{224}$, steering-speed control lever 23 is disposed at a left limit turning position $L_{23}$, as shown in FIG. 11. On the other hand, when cam plates 222L and 222R are set in the forward traveling state shown in FIG. 14, and steering wheel 2 is turned rightward from the straight traveling position, end pin 224 slides along the guide slot toward the upper right end of the guide slot from neutral position $N_{224}$ so as to turn steering-speed control lever 23 rightward from neutral position $N_{23}$, so that hydraulic motor 24 accelerates forwardly rotating left axle 7L and decelerates forwardly rotating right axle 7R, thereby making a right turn of the forwardly traveling vehicle. When end pin 224 reaches right steering limit position $R_{224}$, steering-speed control lever 23 is disposed at a right limit turning position $R_{23}$, as shown in FIG. 11.

When accelerator pedal 3 is depressed for backward traveling under the neutral state of FIG. 12, forward-traveling-setting rotary plate 202F is kept stationary at neutral position $N_{202F}$, and due to the overcenter action of spring 204R, backward-traveling-setting rotary plate 202R turns rightward with respect to FIG. 11 and reaches backward-traveling position $R_{202R}$. Consequently, while forward-traveling-setting cam plate 222F stays at the initial position, link rod 208R is pulled downward by the rightward turning of backward-traveling-setting rotary plate 202R so as to rotate backward-traveling-setting cam plate 222R downwardly rightward against neutral-returning spring 221*b*. In this way, cam plates 222F and 222R are put into the backward traveling state shown in FIG. 15. In this state, the upper range of the guide slot for guiding end pin 224 above pivotal shaft 226 is formed between the left edge of guide hole 222*a* of forward-traveling-setting cam plate 222F and the right edge of guide hole 222*b* of backward-traveling-setting cam plate 222R, and the lower range of the guide slot for guiding end pin 224 below pivotal shaft 226 is formed between the right edge of guide hole 222*b* of forward-traveling-setting cam plate 222F and the left edge of guide hole 222*a* of backward-traveling-setting cam plate 222R, so that the whole guide slot is slanted upwardly leftward.

In this state, when steering wheel 2 is turned leftward from the straight traveling position, end pin 224 slides along the guide slot toward the lower right end of the guide slot from neutral position $N_{224}$ so as to turn steering-speed control lever 23 rightward from neutral position $N_{23}$, so that hydraulic motor 24 decelerates backwardly rotating left axle 7L and accelerates backwardly rotating right axle 7R, thereby making a left turn of the backwardly traveling vehicle. When end pin 224 reaches left steering limit position $L_{224}$, steering-speed control lever 23 is disposed at right limit turning position $R_{23}$, as shown in FIG. 11. On the other hand, when cam plates 222L and 222R are set in the backward traveling state shown in FIG. 15, and steering wheel 2 is turned rightward from the straight traveling position, end pin 224 slides along the guide slot toward the upper left end of the guide slot from neutral position $N_{224}$ so as to turn steering-speed control lever 23 leftward from neutral position $N_{23}$, so that hydraulic motor 24 accelerates backwardly rotating left axle 7L and decelerates backwardly rotating right axle 7R, thereby making a right turn of the backwardly traveling vehicle. When end pin 224 reaches right steering limit position $R_{224}$, steering-speed control lever 23 is disposed at left limit turning position $L_{23}$, as shown in FIG. 11.

Incidentally, similar to displacement-control mechanism 100B, when accelerator pedal 3 depressed for forward traveling is returned to the neutral position, forward-traveling-setting rotary plate 202F remains at forward-traveling position $F_{202F}$ so as to maintain the forward traveling state of cam plates 222F and 222R shown in FIG. 14, where the guide slot formed by cam plates 222F and 222R is extended upwardly rightward slantwise, thereby enabling the left spin turn of the vehicle by leftward turning of steering wheel 2, and enabling the right spin turn of the vehicle by rightward turning of steering wheel 2.

If accelerator pedal 3 after being depressed for forward traveling is depressed to some degree for backward traveling, or if accelerator pedal 3 after being depressed for backward traveling is depressed to some degree for forward traveling, rightward turned rotary plate 202F or 202R returns to neutral position $N_{202F}$ or $N_{202R}$, so that corresponding cam plate 222F or 222R are put into the neutral state show in FIG. 12, thereby preventing the spin turn of the vehicle.

Figure 16:
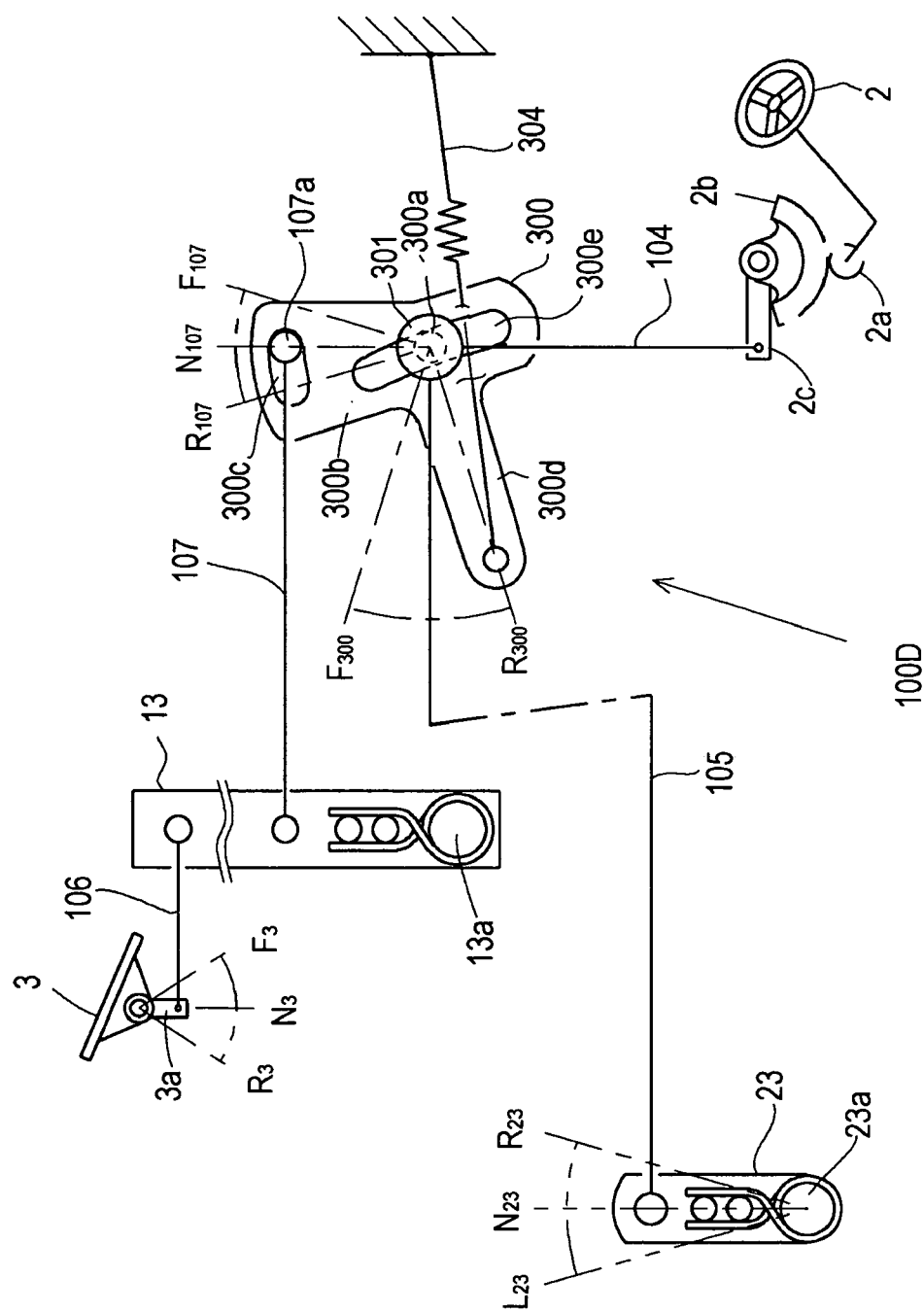
FIG. 16 is a structural diagram of a displacement-control mechanism 100D according to a fourth embodiment of the present invention, when accelerator pedal 3 and steering wheel 2 are disposed at respective neutral positions.

As mentioned above, displacement-control mechanism 100C serves as a reverse logic linkage, using a principle of switching the extension direction of the guide slot for the end pin of the link rod connected to speed-speed control lever 23 among three directions for the neutral state, for the forward traveling state, and for the backward traveling state. Displacement-control mechanism 100D shown in FIG. 16 is a simple structure using the same principle.

Displacement-control mechanism 100D uses a rotary plate 300 pivoted on a pivotal shaft 300a. Rotary plate 300 is integrally formed with a first arm 300b and a second arm 300d extended substantially perpendicular to each other from pivotal shaft 300a. A spring 304 is pivoted at one end thereof onto a tip portion of second arm 300d, and stationarily fixed at the other end thereof on a vehicle.

Link rod 106, extended from arm 3a of accelerator pedal 3, has end pin 106a pivoted on the tip end of traveling-speed control lever 13. Link rod 107, extended from traveling-speed control lever 13, has end pin 107a slidably fitted in a slot 300c bored in first arm 300b of rotary plate 300 and extended along the tip edge of first arm 300b. Rotary plate 300 can be switched between an upper forward-traveling position $F_{300}$ and a lower backward-traveling position $R_{300}$ with respect to the position of second arm 300d in FIG. 16, due to the thrust of end pin 106a disposed at one end of slot 300c against first arm 300b and due to the overcenter action of spring 304.

The length of slot 300c is determined so as to allow the movement of end pin 107a corresponding to the turning of accelerator pedal 3 from neutral position $N_3$ to forward-maximum-speed position $F_3$ while rotary plate 300 is disposed at a forward-traveling position $F_{300}$, and to allow the movement of end pin 107a corresponding to the turning of accelerator pedal 3 from neutral position $N_3$ to backward-maximum-speed position $R_3$ while rotary plate 300 is disposed at a backward-traveling position $R_{300}$. With respect to FIG. 16, when rotary plate 300 is disposed at backward-traveling position $R_{300}$, end pin 107a disposed at a neutral position $N_{107}$ corresponding to neutral position $N_3$ of accelerator pedal 3 is disposed at the right end of slot 300. Therefore, when accelerator pedal 3 is depressed for forward traveling, end pin 107a pushes first arm 300b rightward so as to switch rotary plate 300 to forward-traveling position $F_{300}$. When rotary plate 300 is disposed at forward-traveling position $F_{300}$, end pin 107a disposed at neutral position $N_{107}$ corresponding to neutral position $N_3$ of accelerator pedal 3 is disposed at the left end of slot 300. Therefore, when accelerator pedal 3 is depressed for backward traveling, end pin 107a pushes first arm 300b leftward so as to switch rotary plate 300 to backward-traveling position $R_{300}$.

Rotary plate 300 is formed with a guide slot 300e extended substantially perpendicular to second arm 300d. The axis of pivotal shaft 300a is disposed at the center of guide slot 300e. When rotary plate 300 is disposed at forward-traveling position $F_{300}$, guide slot 300e is slanted upwardly rightward with respect to FIG. 16. When rotary plate 300 is disposed at backward-traveling position $R_{300}$, guide slot 300e is slanted upwardly leftward with respect to FIG. 16. FIG. 16 illustrates rotary plate 300 disposed at backward-traveling position $R_{300}$ with upwardly leftward slanted guide slot 300e.

An end pin 301 is slidably fitted in guide slot 300e. Link rod 104 is extended from arm 2c of sector gear 2b of steering wheel 2, link rod 105 is extended from steering-speed control lever 23 substantially perpendicular to link rod 104, and link rods 104 and 105 are connected at ends thereof to end pin 301. End pin 301 is slid along guide slot 300e upward from the neutral position on the axis of pivotal shaft 300a by rightward turning of steering wheel 2, and downward from the neutral position by leftward turning of steering wheel 2.

As shown in FIG. 16, link rod 105 is assumed to be extended rightward from steering-speed control lever 23. When rotary plate 300 is disposed at backward-traveling position $R_{300}$, due to the upwardly leftward slanting of guide slot 300e, steering-speed control lever 23 turns leftward from neutral position $N_{23}$ as steering wheel 2 is turned rightward, and steering-speed control lever 23 turns rightward from neutral position $N_{23}$ as steering wheel 2 is turned leftward. On the other hand, when rotary plate 300 is disposed at forward-traveling position $F_{300}$, due to the upwardly rightward slanting of guide slot 300e, steering-speed control lever 23 turns rightward from neutral position $N_{23}$ as steering wheel 2 is turned rightward, and steering-speed control lever 23 turns leftward from neutral position $N_{23}$ as steering wheel 2 is turned leftward. In this way, displacement-control mechanism 100D serves as the reverse logic linkage, which switches the turning direction of steering-speed control lever 23 relative to the turning direction of steering wheel 2 between opposite directions depending on whether the vehicle is set for forward traveling or backward traveling.

Incidentally, even if accelerator pedal 3 is returned to neutral position $N_3$, rotary plate 300 still remains at either forward-traveling position $F_{300}$ or backward-traveling position $R_{300}$ where rotary plate 300 is disposed immediately before the neutral-returning of accelerator pedal 3. That is, guide slot 300e is still slanted upwardly leftward or rightward, thereby enabling the spin turn of the vehicle.

Figure 17:
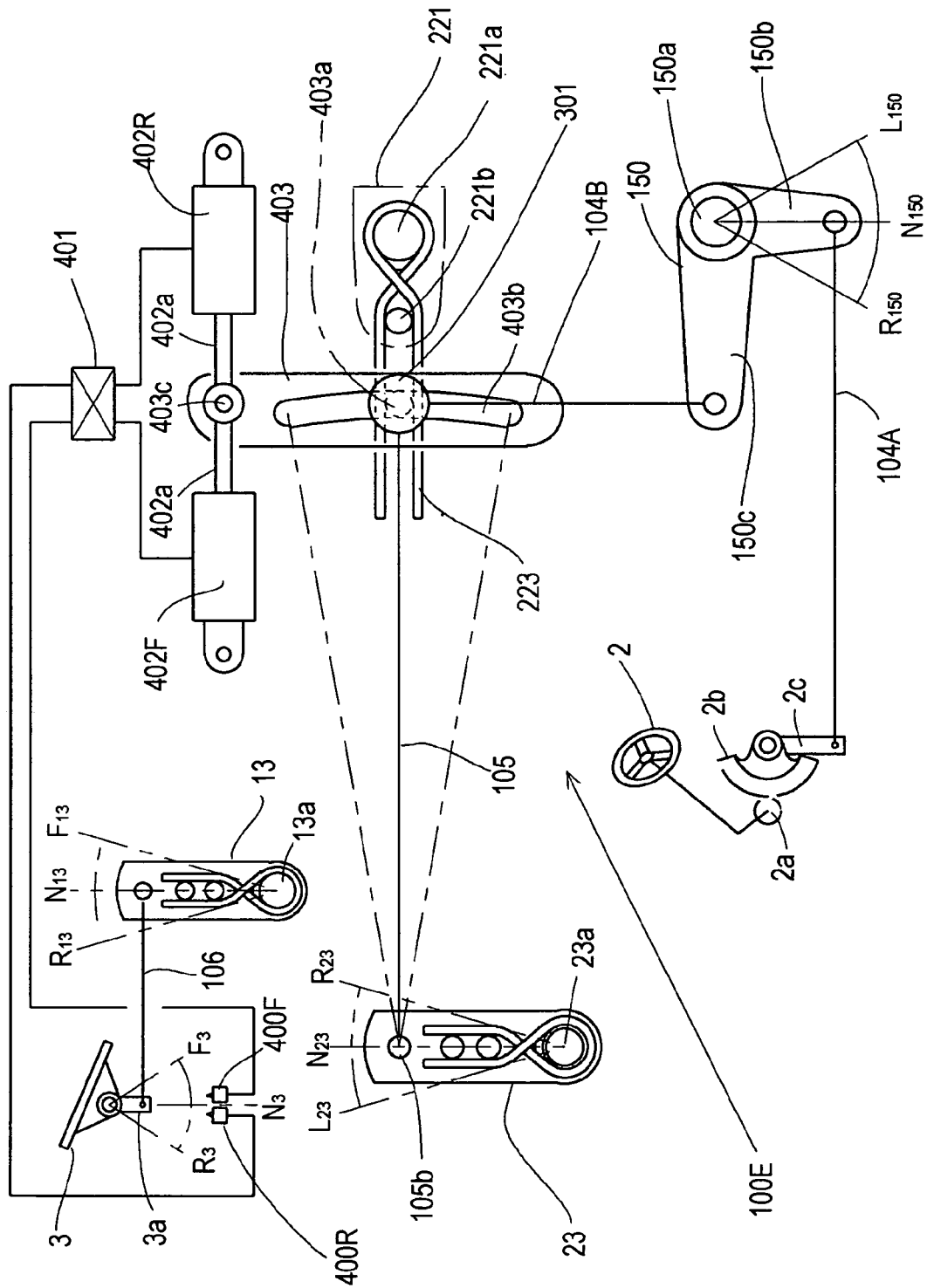
FIG. 17 is a structural diagram of a displacement-control mechanism 100E according to a fifth embodiment of the present invention, when accelerator pedal 3 and steering wheel 2 are disposed at respective neutral positions.

Similar to displacement-control mechanism 100D, displacement-control mechanism 100E shown in FIG. 17 switches the extension direction of the guide slot for guiding common end pin 301 of link rods 105 and 104 extended from steering-speed control lever 23 and steering wheel 2 between two direction for forward traveling and for backward traveling. With respect to the different point of displacement-control mechanism 100E from displacement-control mechanism 100D, an electronic actuator switches the extension direction of the guide slot.

In this regard, a rotary member 403 is formed with an arcuate guide slot 403b for guiding end pin 301, and is rotatable around the axis of a pivotal shaft 403a disposed at the center of guide slot 403b. An end pin 403c is pivoted on a tip portion of rotary member 403. Actuator cylinders 402F and 402R are disposed opposite to each other with respect to end pin 403c, and have respect piston rods 402a connected at tip ends thereof to common end pin 403c. Hydraulic cylinders, pneumatic cylinders, or vacuum cylinders may serve as actuator cylinders 402F and 402R. Alternatively, electromagnetic solenoids may serve as actuator cylinders 402F and 402R. The only thing required for the actuators of displacement-control mechanism 100E is to switch rotary member 403 between two positions: one is a forward-traveling position for setting guide slot 403b in the direction for forward traveling; and the other is a backward-traveling position for setting guide slot 403b in the direction for backward traveling.

On the assumption that link rod 105 is extended rightward from steering-speed control lever 23 as shown in FIG. 17, rotary member 403 is disposed at the forward-traveling position, where guide slot 403b is slanted upwardly rightward by extension of piston rod 402a of actuator 402F and contraction of piston rod 402a of actuator 402R. On the same assumption, rotary member 403 is disposed at the backward-traveling position, where guide slot 403b is slanted upwardly leftward, by contraction of piston rod 402a of actuator 402F and extension of piston rod 402a of actuator 402R.

A controller 401 is provided for controlling actuators 402F and 402R. A forward-traveling-setting switch 400F and a backward-traveling-setting switch 400R are disposed adjacent to arm 3a of accelerator pedal 3 and opposite to each other with respect to arm 3a, so that either switch 400F or 400R is switched on by depression of accelerator pedal 3 for forward traveling or backward traveling. When accelerator pedal 3 is depressed for forward traveling, forward-traveling-setting switch 400F abuts against arm 3a, and is switched on. Controller 401 receives the switch-on signal of switch 400F, and correspondingly extends piston rod 402a of actuator 402F and contract piston rod 402a of actuator 402R, thereby setting rotary member 403 at the forward-traveling position. When accelerator pedal 3 is depressed for backward traveling, backward-traveling-setting switch 400R abuts against arm 3a, and is switched on. Controller 401 receives the switch-on signal of switch 400R, and correspondingly contracts piston rod 402a of actuator 402F and extends piston rod 402a of actuator 402R, thereby setting rotary member 403 at the backward-traveling position.

When arm 3a is disposed at neutral position $N_3$, both switches 400F and 400R are switched off. If strokes of piston rods 402a of actuators 402F and 402R are equalized in correspondence to the switch-off of both switches 400F and 400R, guide slot 403a becomes substantially vertical with respect to FIG. 17. In this state, if the curvature of arcuate guide slot 403b coincides with the curvature of rotational locus of the end of link rod 105 centered on opposite end pin 105b on steering-speed control lever 23, steering-speed control lever 23 is held (prevented from being turned) regardless of wherever end pin 301 moves in guide slot 403b by turning of steering wheel 2. Therefore, the spin turn of the vehicle is prevented. In this way, rotary member 403 may be switched among three positions: the forward-traveling position; the backward-traveling position; and the neutral position for preventing the spin turn of the vehicle.

Alternatively, rotary member 403 may be held at either the forward-traveling position or the backward-traveling position even if both switches 400F and 400R are switched off (even if switch 400F or 400R having been switched on immediately before accelerator pedal 3 is returned to the neutral position is switched off), thereby enabling the spin turn when accelerator pedal 3 is disposed at the neutral position. Further, rotary member 403 may be disposed at only the forward-traveling position when both switches 400F and 400R are switched off, thereby matching the spin turn direction with the turning direction of steering wheel 2 regardless of whether accelerator pedal 3 has been depressed for forward traveling or backward traveling just before returned to the neutral position.

Further, if the stroke of piston rod 402a of each actuator 402F or 402R corresponding to the forward-traveling position, the backward-traveling position or the neutral position of rotary member 403 is variable, the turning degree of steering-speed control lever 23 relative to the turning of steering wheel 2, i.e., the turning degree of the vehicle relative to the turning of steering wheel 2 can be adjusted.

Incidentally, in FIG. 17, link rod 104 between steering wheel 2 and end pin 301 is divided into link rods 104A and 104B. Link rod 104A is connected at one end thereof to arm 2c, and link rod 104B is connected at one end thereof to end pin 301. A direction-changing rotary plate 150 is disposed between link rods 104A and 104B. Direction-changing rotary plate 150 is pivoted on a pivotal shaft 150a, and is L-like shaped so as to have a first arm 150b and a second arm 150c, which are extended perpendicular to each other from pivotal shaft 150a. Link rod 104A is connected at the other end thereof to the tip of first arm 150b, and link rod 104B is connected at the other end thereof to the tip of second arm 150c. Due to the interposition of direction-changing rotary plate 150 in link rod 104, link rod 104 can be divided into substantially mutually perpendicular link rods 104A and 104B, that is, the extension direction of link rod 104 can be changed at any optimal portion thereof in correspondence to the positions of steering wheel 2 and rotary member 403.

In displacement-control mechanism 100E, alternatively, direction-changing rotary plate 150 may be removed and undivided link rod 104 may be extended from steering wheel 2 to end pin 301 if there is no confliction between the rotational direction of arm 2c interlocking with steering wheel 2 and the sliding direction of end pin 301 along guide slot 403b.

In each of displacement-control mechanisms 100A to 100D shown in FIGS. 2 to 16, direction-changing rotary plate 150 may be optionally provided for changing the extension direction of link rod 104 at need. Further, link rod 106 extended from arm 3a of accelerator pedal 3 may be adapted to change its direction at an intermediate portion thereof, as well as link rod 104 from steering wheel 2.

In FIG. 17, direction-changing rotary plate 150 is rotated in the range between a left steering limit position $L_{150}$ and a right steering limit position $R_{150}$ with the position of respect to first arm 150b. When steering wheel 2 is disposed at the neutral poison (straight traveling position), direction-changing rotary plate 150 is disposed at a neutral position $N_{150}$, so as to set end pin 301 at the neutral position in guide slot 403b on the axis of pivotal shaft 403a.

When steering wheel 2 is fully turned rightward, direction-changing rotary plate 150 rotates from neutral position $N_{150}$ to right steering limit position $R_{150}$, so as to move end pin 301 upward with respect to FIG. 17 from the neutral position on the axis of pivotal shaft 403a. During the upward movement of end pin 301, steering-speed control lever 23 is turned from neutral position $N_{23}$ to right limit turning position $R_{23}$ when rotary member 403 is disposed at the forward-traveling position, or steering-speed control lever 23 is turned from neutral position $N_{23}$ to left limit turning position $L_{23}$ when rotary member 403 is disposed at the backward-traveling position.

When steering wheel 2 is fully turned leftward, direction-changing rotary plate 150 rotates from neutral position $N_{150}$ to left steering limit position $L_{150}$, so as to move end pin 301 downward with respect to FIG. 17 from the neutral position on the axis of pivotal shaft 403a. During the downward movement of end pin 301, steering-speed control lever 23 is turned from neutral position $N_{23}$ to left limit turning position $L_{23}$ when rotary member 403 is disposed at the forward-traveling position, or steering-speed control lever 23 is turned from neutral position $N_{23}$ to right limit turning position $R_{23}$ when rotary member 403 is disposed at the backward-traveling position.

Displacement-control mechanism 100F will now be described with reference to FIGS. 18 to 21. Displacement-control mechanism 100F comprises: a traveling-direction switching rotary plate 501; a steering-setting rotary plate 503; and a spring 502 for biasing end pin 107 of link rod 107 fitted in traveling-direction switching rotary plate 501.

L-like shaped traveling-direction switching rotary plate 501, having a first arm 501b and a second arm 501d, is pivoted on a pivotal shaft 501a. First arm 501b and second arm 501d are extended substantially perpendicular to each other from pivotal shaft 501a. With respect to FIG. 18 to 21, first arm 501b is extended substantially upward, and second arm 501d is extended substantially leftward.

Steering-setting rotary plate 503 is pivoted on a pivotal shaft 503a. Steering-setting rotary plate 503 is formed with a guide slot 503b. The axis of pivotal shaft 503a is disposed at the center of guide slot 503b. End pin 105a of link rod 105 extended from steering-speed control lever 23 is slidably fitted in guide slot 503b. End pin 104a of link rod 104 extended from steering wheel 2 is pivoted on a tip portion of steering-setting rotary plate 503. Similar to steering-setting rotary plate 101 of displacement-control mechanism 100A, steering-setting rotary plate 503 is rotated centered on pivotal shaft 503a by the movement of link rod 104 depending on turning of steering wheel 2, so as to pull or push link rod 105 for turning steering-speed control lever 23.

End pin 105a is also fitted in a play hole 501e formed in a tip portion of second arm 501d of traveling-direction switching rotary plate 501, thereby allowing the movement of end pin 105a according to the rotation of steering-setting rotary plate 503 pushed or pulled by link rod 104 while keeping the attitude of traveling-direction switching rotary plate 501.

First arm 501 of traveling-direction switching rotary plate 501 is formed with a substantially triangular guide hole 501c. End pin 107a of link rod 107 extended from traveling-speed control lever 13 is fitted in guide hole 501c. End pin 107a is slidable along either the left or right edge of guide hole 501c with respect to FIGS. 18 to 21. To smoothen the sliding of end pin 107a, preferably, end pin 107a may be provided with a roller. The right edge of guide hole 501c functions as a portion pressed against end pin 107a for setting traveling-direction switching rotary plate 501 to a forward traveling position, and the left edge of guide hole 501c functions as a portion pressed against end pin 107a for setting traveling-direction switching rotary plate 501 to a backward traveling position. End pin 107a is pressed against the left or right edge of guide hole 501c due to the weight thereof and the force of spring 502.

Figure 18:
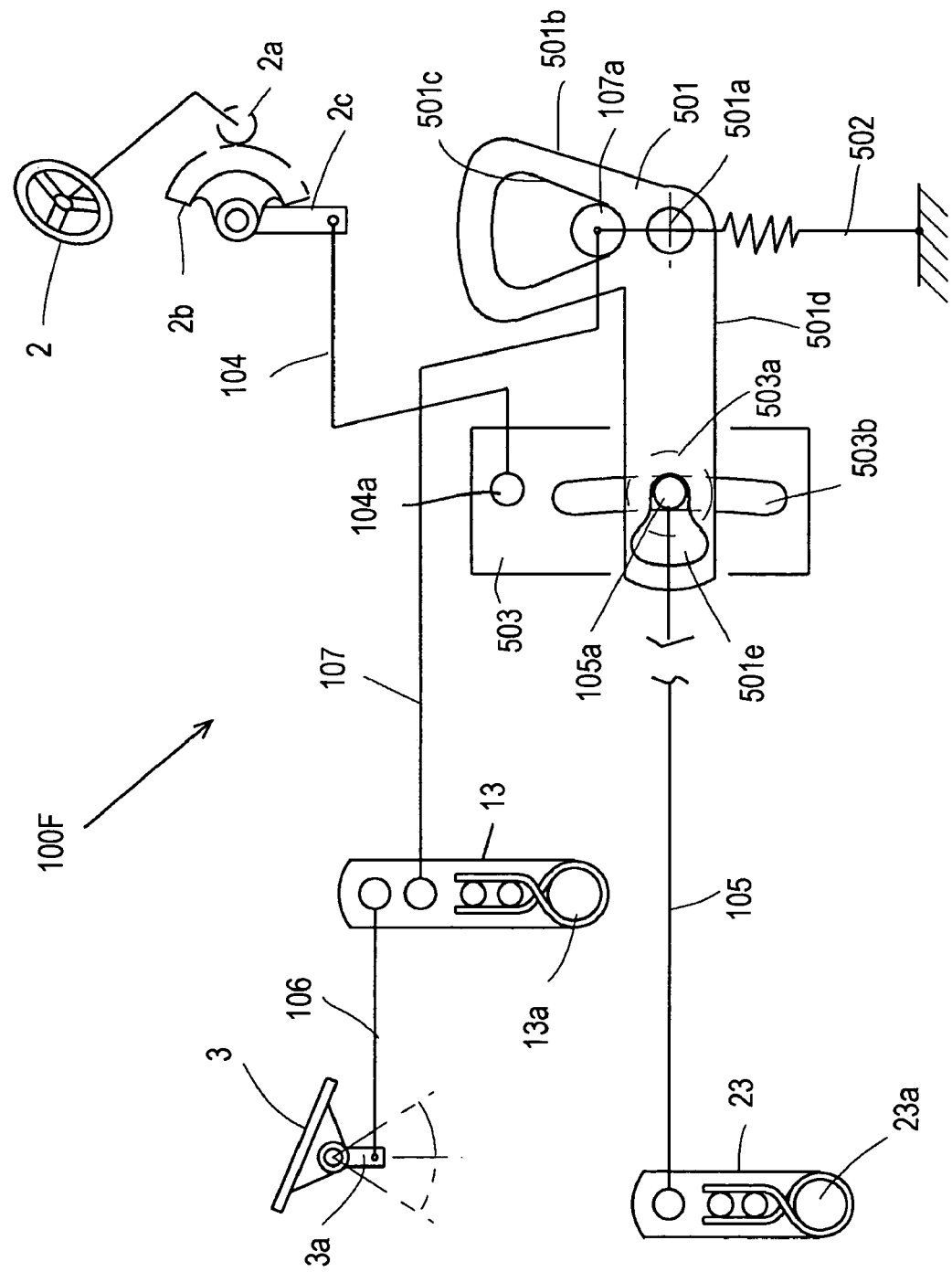
FIG. 18 is a structural diagram of a displacement-control mechanism 100F according to a sixth embodiment of the present invention, when accelerator pedal 3 and steering wheel 2 are disposed at respective neutral positions.

The operation process of displacement-control mechanism 100F will now be described with reference to FIGS. 18 to 21. In FIG. 18, both accelerator pedal 3 and steering wheel 2 are disposed at the respective neutral positions. Since traveling-speed control lever 13 is disposed at the neutral position, end pin 107a of link rod 107 is fitted on the bottom recess of guide hole 501c between the left and right edges, whereby neither the left edge nor the right edge receives the weight of end pin 107a. Further, spring 502 biases end pin 107a so as to prevent end pin 107a from escaping from the bottom recess of guide hole 501c. In this way, the bottom recess of guide hole 501c between the left and right edges functions as a portion pressed against end pin 107a for setting a neutral state, where traveling-direction switching rotary plate 501 is held in the condition that second arm 501d passes the center of guide slot 503b of steering-setting rotary plate 503, and end pin 105a is held in play hole 501d at the neutral position on the axis of pivotal shaft 503a.

In this state, even if steering wheel 2 is turned so as to rotate steering-setting rotary plate 503 via link rod 104, end pin 105a and steering-speed control lever 23 are stationary, thereby preventing the vehicle from making the spin turn.

Figure 19:
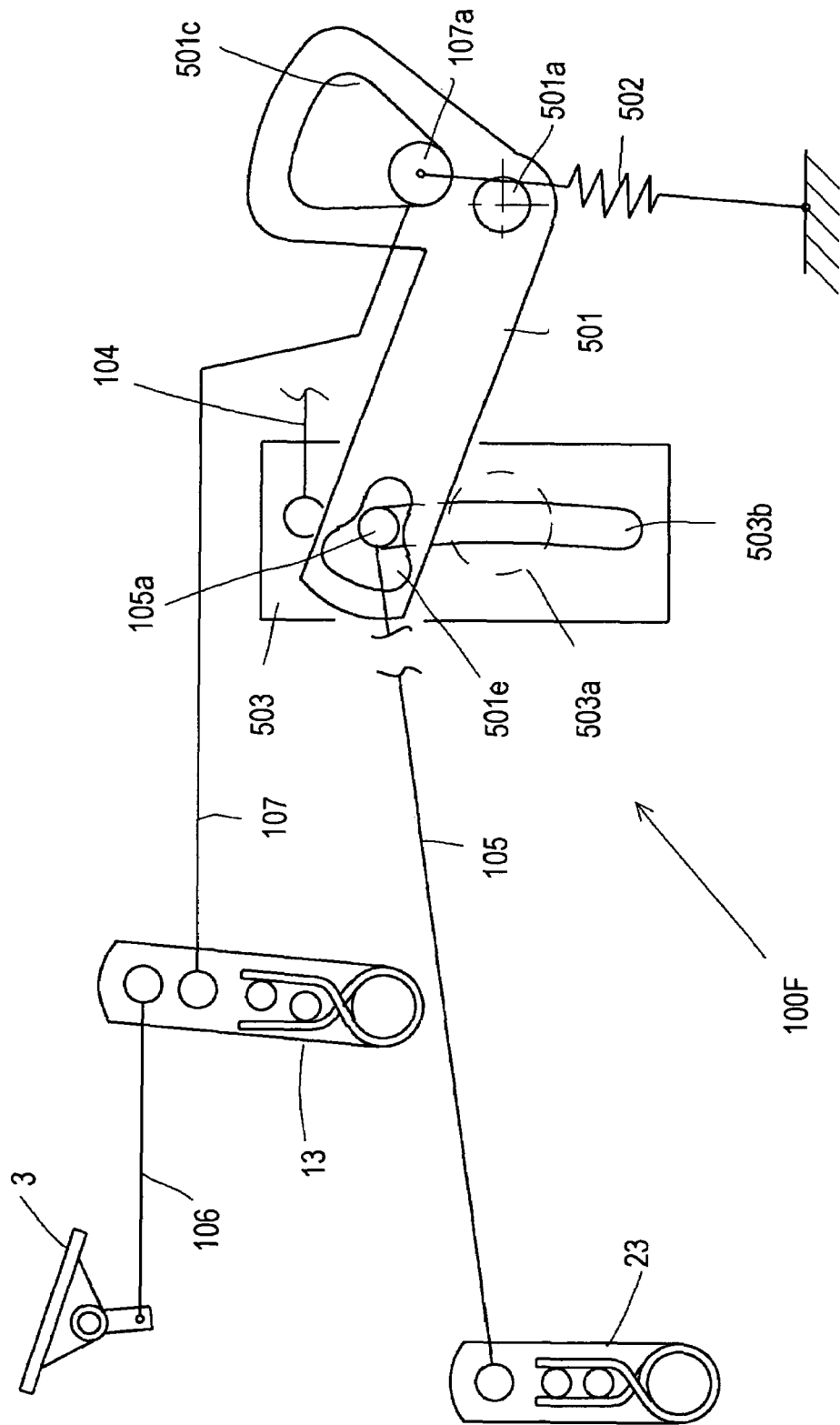
FIG. 19 is a structural diagram of displacement-control mechanism 100F when accelerator pedal 3 is slightly depressed for forward traveling while keeping steering wheel 2 at the straight traveling (neutral) position.

End pin 107a slips from the bottom recess of guide slot 501c and rides on either the left or right edge of guide slot 501c only by slight depression of accelerator pedal 3 for forward traveling or backward traveling. FIG. 19 illustrates accelerator pedal 3 depressed for forward traveling, and end pin 107a riding on the right edge of guide slot 501c. The force of spring 502 and the weight of end pin 107a are applied downward onto the edge of guide slot 501c ridden by end pin 107a so as to push down first arm 50b, thereby downwardly rotating traveling-direction setting rotary plate 501 centered on pivotal shaft 501a, and thereby upwardly or downwardly rotating second arm 501d. Consequently, end pin 105a in play hole 501e reaches the upper or lower end of guide slot 503b. FIG. 19 illustrates upwardly rotated second arm 501d, and end pin 105a reaching the upper end of guide slot 503b.

Figure 20:
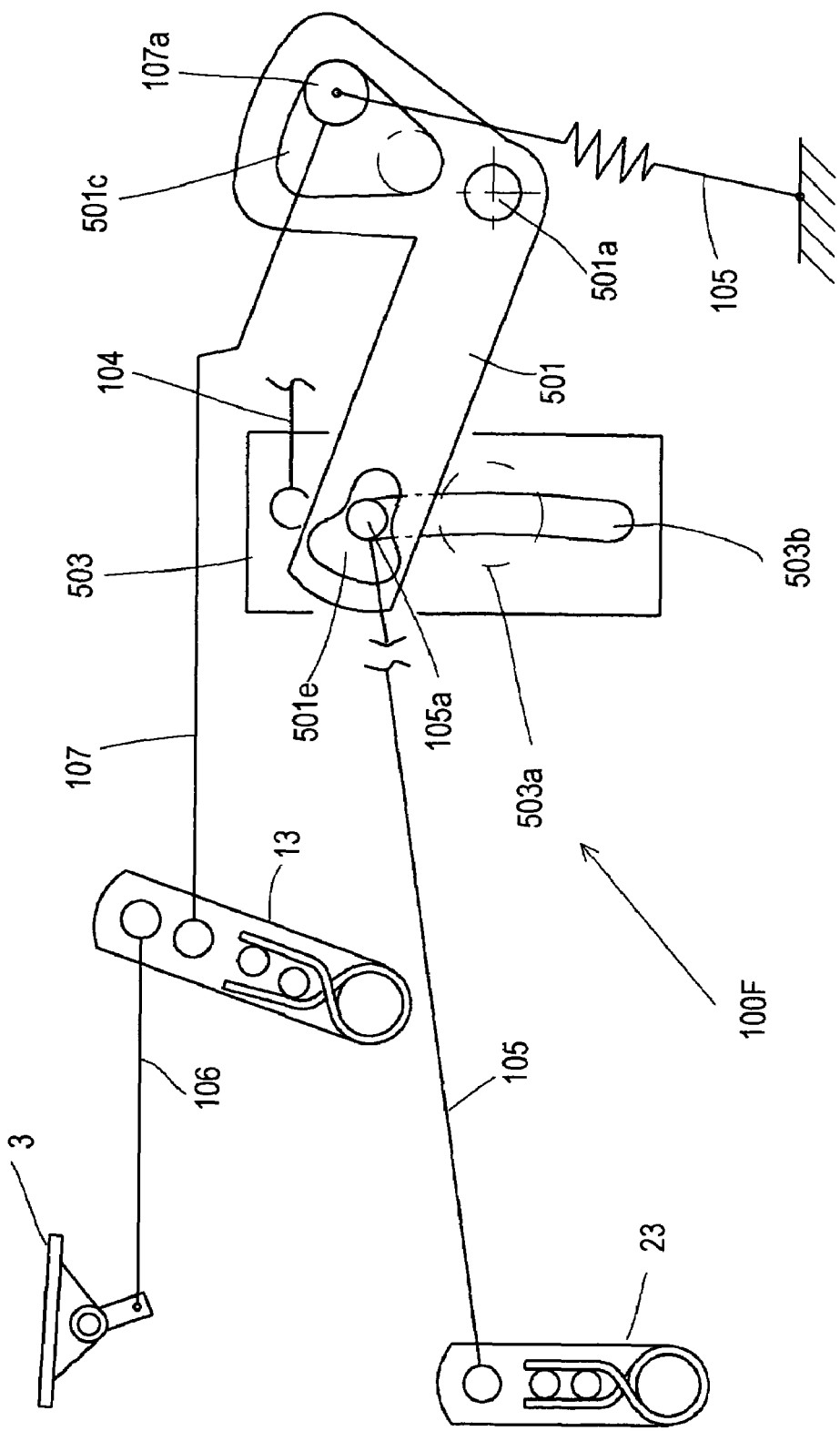
FIG. 20 is a structural diagram of displacement-control mechanism 100F when accelerator pedal 3 is fully depressed for forward traveling while keeping steering wheel 2 at the straight traveling (neutral) position.

As the depression degree of accelerator pedal 3 is increased, end pin 107a riding on one of the left and right edges of guide slot 501c moves along the edge. When accelerator pedal 3 is fully depressed for forward traveling, as shown in FIG. 20, end pin 107a reaches the right upper corner of guide hole 501c. During the movement of end pin 107a along the right edge of guide slot 501c, the right edge of guide slot 501c is pressed downward by end pin 107a and spring 502, so that traveling-direction switching rotary plate 501 is retained at the forward-traveling position where end pin 105a is disposed at the upper end of guide slot 503b.

Figure 21:
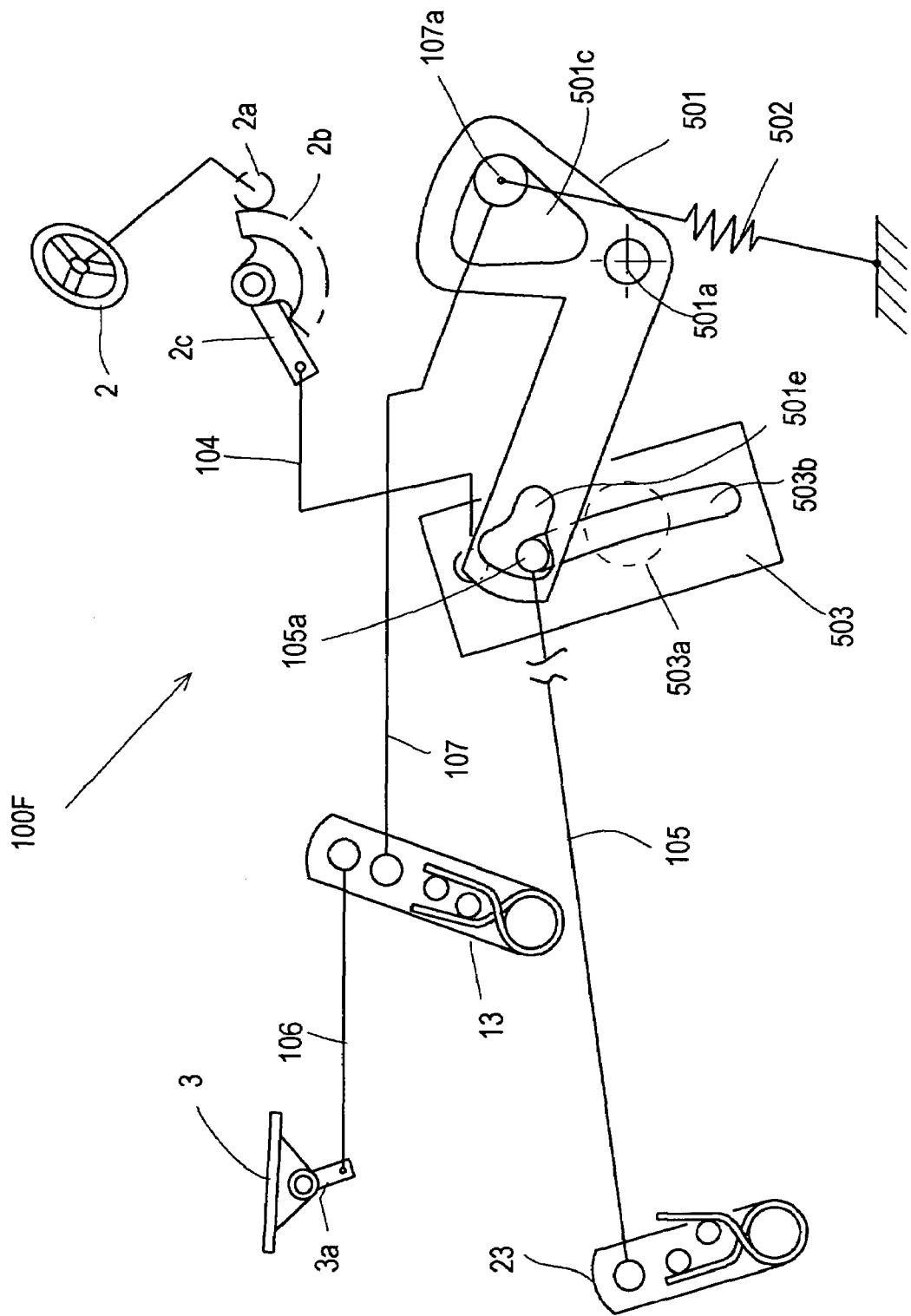
FIG. 21 is a structural diagram of displacement-control mechanism 100F when accelerator pedal 3 is fully depressed for forward traveling and steering wheel 2 is turned leftward.

In the situation that traveling-direction switching rotary plate 501 is disposed at the forward-traveling position, when steering wheel 2 is turned leftward, as shown in FIG. 21, steering-setting rotary plate 503 is rotated leftward so as to move end pin 105a leftward in play hole 501e, thereby turning steering-speed control lever 23 leftward from the neutral position through link rod 105. In the same situation, when steering wheel 2 is turned rightward, steering-setting rotary plate 503 is rotated rightward so as to move end pin 105a rightward in play hole 501e, thereby turning steering-speed control lever 23 rightward from the neutral position.

When accelerator pedal 3 is returned to the neutral position, as shown in FIG. 18, end pin 107a returns to the bottom recess of guide slot 501c so that traveling-direction switching rotary plate 501 returns to the neutral position, where end pin 105a is disposed at the neutral position on the axis of pivotal shaft 503a so as to prevent the vehicle from making the spin turn.

When accelerator pedal 3 is depressed for backward traveling, end pin 107a rides on the left edge of guide slot 501c, so that traveling-direction switching rotary plate 501 rotates so as to downwardly rotate second arm 501d. Consequently, traveling-direction switching rotary plate 501 is disposed at the backward-traveling position, where end pin 105a is disposed at the lower end of slot guide 503b. The force of spring 502 and the weight of end pin 107a retains traveling-direction switching rotary plate 501 at the backward-traveling position. In this situation, when steering wheel 2 is turned leftward, steering-setting rotary plate 503 is rotated rightward so as to move end pin 105a rightward in play hole 501e, thereby turning steering-speed control lever 23 rightward from the neutral position. In the same situation, when steering wheel 2 is turned rightward, steering-setting rotary plate 503 is rotated leftward so as to move end pin 105a leftward in play hole 501e, thereby turning steering-speed control lever 23 leftward from the neutral position.

Figure 22:
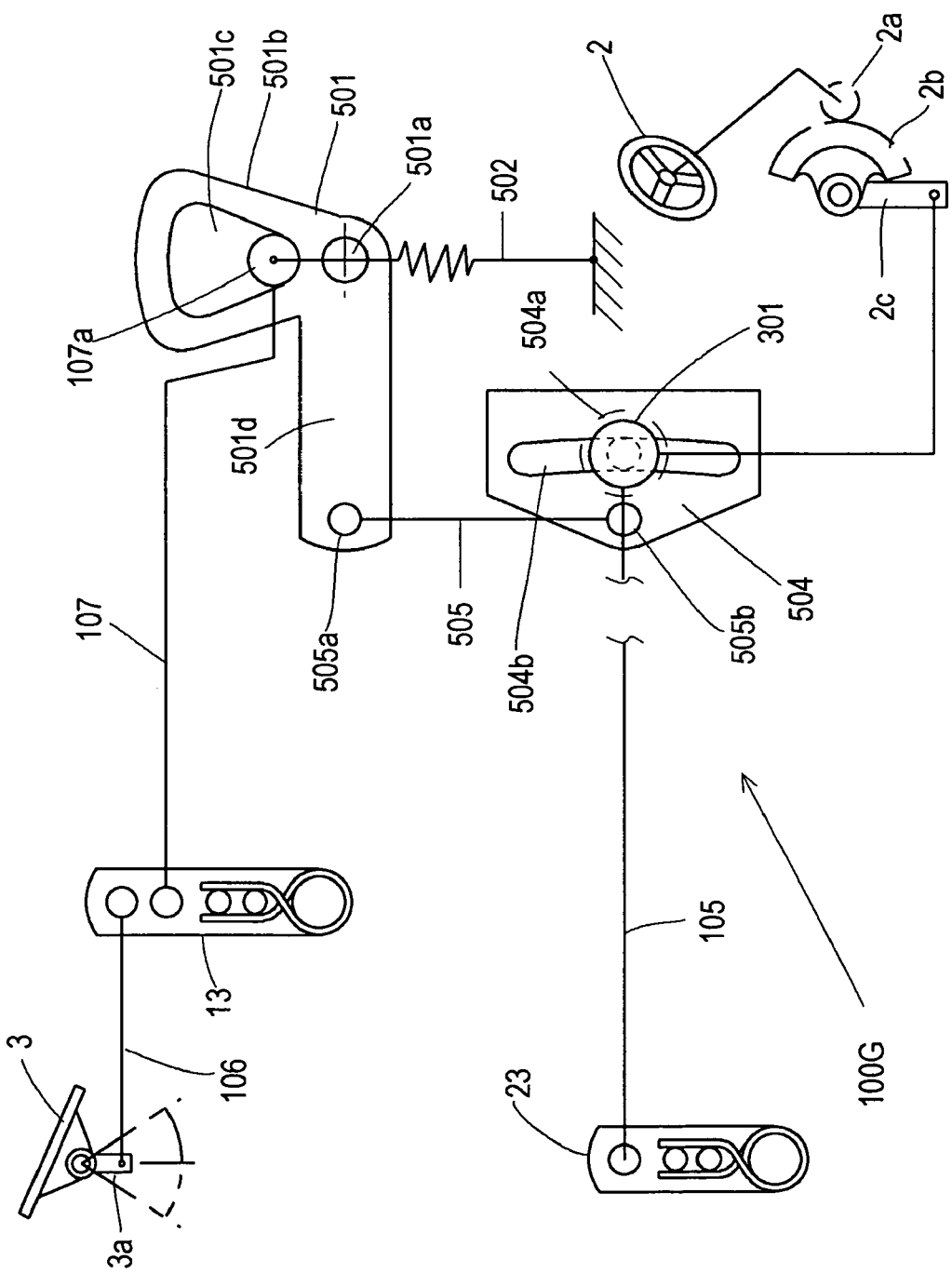
FIG. 22 is a structural diagram of a displacement-control mechanism 100G according to a seventh embodiment of the present invention, when accelerator pedal 3 and steering wheel 2 are disposed at respective neutral positions.
Figure 23:
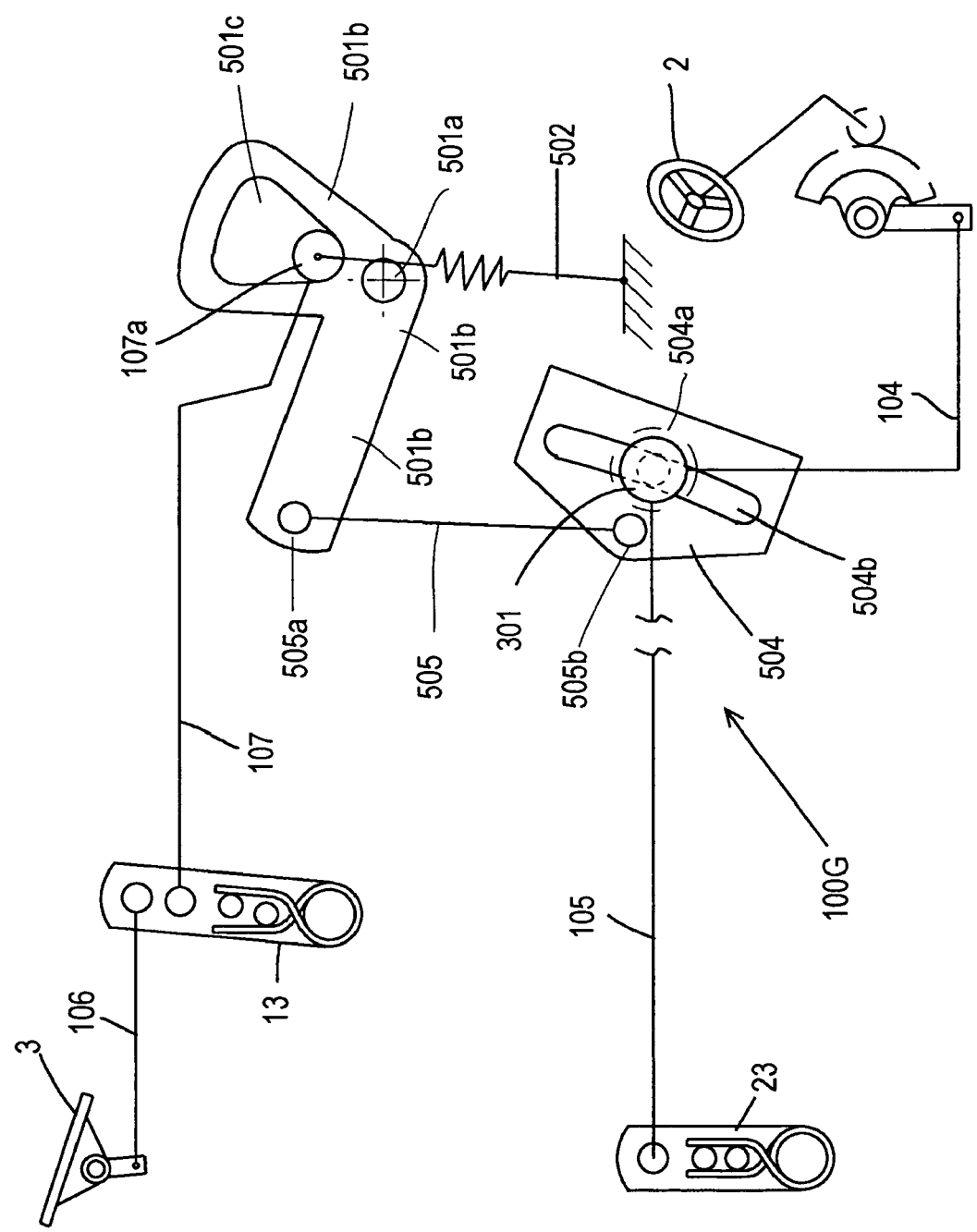
FIG. 23 is a structural diagram of displacement-control mechanism 100G when accelerator pedal 3 is depressed for forward traveling while keeping steering wheel 2 at the straight traveling (neutral) position.

Displacement-control mechanism 100G will now be described with reference to FIGS. 22 and 23. Similar to displacement-control mechanism 100F, displacement-control mechanism 100G comprises: traveling-direction switching rotary plate 501; and spring 502 for biasing end pin 107a of link rod 107 fitted in guide hole 501c of traveling-direction switching rotary plate 501. Traveling-direction switching rotary plate 501 is rotatable centered on pivotal shaft 501a so as to be switched among the neutral position, the forward-traveling position and the backward-traveling position in correspondence to the movement of end pin 107a in guide hole 501c biased by spring 502, similar to traveling-direction switching rotary plate 501 of displacement-control mechanism 100F.

A steering-setting rotary plate 504 is pivoted on a pivotal shaft 504a, and formed with a guide slot 504b in which common end pin 301 of link rods 105 and 104 extended from steering-speed control lever 23 and steering wheel 2 is slidably fitted. An end pin 505a is pivoted on the tip portion of second arm 501d of traveling-direction switching rotary plate 501. An end pin 505b is pivoted on a tip portion of steering-setting rotary plate 504. A link rod 505 is extended between end pins 505a and 505b.

Due to the connection of steering-setting rotary plate 504 to traveling-direction switching rotary plate 501 through link rod 505, steering-setting rotary plate 504 is rotatable centered on pivotal shaft 504a substantially integrally with traveling-direction switching rotary plate 501, so as to be switched among a neutral position, a forward-traveling position and a backward-traveling position, corresponding to the neutral position, the forward-traveling position and the backward-traveling position of traveling-direction switching rotary plate 501, respectively. Due to the switching of steering-setting rotary plate 504 among the three positions, the extension direction of guide slot 504b is switched among three directions, so as to change the relation of the sliding direction of end pin 301 along guide slot 504b to the turning direction of steering-speed control lever 23. This is the same principle of the reverse logic linkage represented as displacement-control mechanism 100C, 100D and 100E.

The present invention is adaptable to a vehicle driven by combination of a traveling HST and a steering HST. The reverse logic linkage of the present invention is not provided with any special actuator, such as a hydraulic actuator or an electric actuator, but is a mechanical linkage comprising mechanical, simple and economic elements including a biasing member. Therefore, especially, the present invention is appropriate to small-size vehicles, which may be wheel-type vehicles such as lawn tractors, or crawler-type vehicles such as combines with steering wheels.

Although the invention has been described in its preferred form with a certain degree of particularity, it is understood that the present disclosure of the preferred form can be changed in the details of construction, and the combination and arrangement of parts may be changed, without departing from the spirit and the scope of the invention as hereinafter claimed.

What is claimed is:

1. A displacement-control mechanism of a hydrostatic transmission system for a vehicle, the vehicle comprising:

left and right axles;

a traveling manipulator for setting forward or backward traveling direction and speed of the vehicle; and a steering manipulator for setting left or right turning direction and angle of the vehicle, the hydrostatic transmission system comprising:

a variable displacement traveling hydrostatic transmission for driving left and right axles at variable common speed and in forward or backward common direction, the traveling hydrostatic transmission including a traveling displacement-control device, wherein a movement direction of the traveling displacement-control device is selected for selecting either the forward or backward common driving direction of the left and right axles depending on the forward or backward traveling direction setting of the traveling manipulator, and wherein a movement degree of the traveling displacement-control device is changed for changing the forward or backward common driving speed of the left and right axles depending on the traveling speed setting of the traveling manipulator; and a variable displacement steering hydrostatic transmission for selectively accelerating one of the left and right axles and decelerating the other axle, the steering hydrostatic transmission including a steering displacement-control device, wherein a movement direction of the steering displacement-control device is selected for selecting which of the axles to be accelerated or decelerated depending on the left or right turning direction setting of the steering manipulator, and wherein a movement degree of the steering displacement-control device is changed for changing the relative speed of the left and right axles depending on the turning angle setting of the traveling manipulator, the displacement-control mechanism comprising:

a steering link member extended from the steering displacement-control device, the steering link member having an end opposite to the steering displacement-control device;

a traveling-direction switching rotary member interlocking with the traveling manipulator or the traveling displacement-control device, wherein the steering link member is connected at the end thereof to the traveling-direction switching rotary member, and wherein the traveling-direction switching rotary member is rotatable so as to be switched between a forward-traveling position and a backward-traveling position depending on whether the traveling manipulator is operated for forward traveling or backward traveling;

a mechanical biasing member for switching the traveling-direction switching rotary member between the forward-traveling position and the backward-traveling position, and for retaining the traveling-direction switching rotary member at either the forward-traveling position or the backward-traveling position; and a steering-setting rotary member operatively connected to the steering manipulator so as to be rotatable around a pivotal shaft according to manipulation of the steering manipulator, wherein the steering-setting rotary member is formed with a guide slot in which the end of the steering link member is slidably fitted, wherein both ends of the guide slot are disposed opposite to each other with respect to an axis of the pivotal shaft so as to move in opposite directions to each other during the rotation of the steering-setting rotary member, and wherein the end of the steering link member is selectively disposed at one of the opposite ends of the guide slot depending on whether the traveling-direction switching rotary member is disposed at the forward-traveling position or the backward-traveling position.

2. The displacement-control mechanism according to claim 1, wherein the axis of the pivotal shaft of the steering-setting rotary member is disposed in the guide slot between the opposite ends of the guide slot, wherein, when the traveling manipulator and the traveling displacement control device are disposed for setting the traveling hydrostatic transmission into a neutral state, the traveling-direction switching rotary member is switched to a neutral position for setting the end of the steering link member onto the axis of the pivotal shaft in the guide slot of the steering-setting rotary member.

3. The displacement-control mechanism according to claim 1, the traveling-direction switching rotary member including a first portion and a second portion, further comprising:

a traveling link member extended from the traveling manipulator or the traveling displacement-control device, the traveling link member having an end opposite to the traveling manipulator or the traveling displacement-control device, wherein the end of traveling link member is fitted to the traveling-direction switching rotary member so as to be movable relatively to the traveling-direction switching rotary member according to movement of the traveling manipulator or the traveling displacement-control device, wherein the traveling-direction switching rotary member is disposed at the forward-traveling position when the end of the traveling link member is pressed against the first portion of the traveling-direction switching rotary member, and wherein the traveling-direction switching rotary member is disposed at the backward-traveling position when the end of the traveling link member is pressed against the second portion of the traveling-direction switching rotary member.

4. The displacement-control mechanism according to claim 3, the traveling-direction switching rotary member further comprising:

a slot, in which the end of the traveling link member is fitted so as to be movable therein in correspondence to the movement of the traveling manipulator or the traveling displacement-control device, wherein opposite ends of the slot of the traveling-direction switching rotary member serve as the first and second portions of the traveling-direction switching rotary member, and wherein the switching of the traveling-direction switching rotary member between the forward-traveling position and the backward-traveling position depends on thrust of the end of the traveling link member against one of the ends of the slot of the traveling-direction switching rotary member, and on an overcenter spring action of the mechanical biasing member.

5. The displacement-control mechanism according to claim 3, the traveling-direction switching rotary member further comprising:

a guide hole having first and second edges serving as the respective first and second portions of the traveling-direction switching rotary member, wherein the end of the traveling link member is fitted in the guide hole so as to be selectively movable along either the first or second edge in correspondence to movement of the traveling manipulator or the traveling displacement-control device, and pressed against the selective first or second edge by the biasing member; and an active portion selectively rotated in one of opposite directions depending on whether the first or second edge of the guide hole is pressed by the end of the traveling link member, wherein the end of the steering link member is fitted onto the active portion so that the end of the steering link member is selectively disposed at one of the opposite ends of the guide slot of the steering-setting rotary member according to the rotation of the active portion.

6. The displacement-control mechanism according to claim 5, wherein the axis of the pivotal shaft of the steering-setting rotary member is disposed in the guide slot between the opposite ends of the guide slot, wherein the guide hole of the traveling-direction switching rotary member further includes a third portion between the first and second edges, wherein, when the traveling manipulator and the traveling displacement-control device are disposed for setting the traveling hydrostatic transmission into a neutral state, the end of the traveling link member is disposed at the third portion so as to set the end of the steering link member onto the axis of the pivotal shaft in the guide slot of the steering-setting rotary member.

7. The displacement-control mechanism according to claim 1, the biasing member comprising:
a forward-traveling setting biasing member; and
a backward-traveling setting biasing member, and
the traveling-direction switching rotary member comprising:

a forward-traveling setting rotary member which can be switched between a neutral position and a forward-traveling position depending on an overcenter spring action of the forward-traveling setting biasing member; and a backward-traveling setting rotary member which can be switched between a neutral position and a backward-traveling position depending on an overcenter spring action of the backward-traveling setting biasing member, wherein the end of the steering link member is disposed at one of the opposite ends of the guide slot of the steering-setting rotary member when the forward-traveling setting rotary member is disposed at the forward-traveling position and the backward-traveling setting rotary member is disposed at the neutral position, and wherein the end of the steering link member is disposed at the other end of the guide slot of the steering-setting rotary member when the forward-traveling setting rotary member is disposed at the neutral position and the backward-traveling setting rotary member is disposed at the backward-traveling position.

8. The displacement-control mechanism according to claim 7, wherein the axis of the pivotal shaft of the steering-setting rotary member is disposed in the guide slot between the opposite ends of the guide slot, and wherein the end of the steering link member is disposed on the axis of the pivotal shaft in the guide slot of the steering-setting rotary member when the forward-traveling setting rotary member and the backward-traveling setting rotary member are disposed at the respective neutral positions.

9. A displacement-control mechanism of a hydrostatic transmission system for a vehicle, the vehicle comprising:
left and right axles;
a traveling manipulator for setting forward or backward traveling direction and speed of the vehicle; and
a steering manipulator for setting left or right turning direction and angle of the vehicle, the hydrostatic transmission system comprising:

a variable displacement traveling hydrostatic transmission for driving left and right axles at variable common speed and in forward or backward common direction, the traveling hydrostatic transmission including a traveling displacement-control device, wherein a movement direction of the traveling displacement-control device is selected for selecting either the forward or backward common driving direction of the left and right axles depending on the forward or backward traveling direction setting of the traveling manipulator, and wherein a movement degree of the traveling displacement-control device is changed for changing the forward or backward common driving speed of the left and right axles depending on the traveling speed setting of the traveling manipulator; and a variable displacement steering hydrostatic transmission for selectively accelerating one of the left and right axles and decelerating the other axle, the steering hydrostatic transmission including a steering displacement-control device, wherein a movement direction of the steering displacement-control device is selected for selecting which of the axles to be accelerated or decelerated depending on the left or right turning direction setting of the steering manipulator, and wherein a movement degree of the steering displacement-control device is changed for changing the relative speed of the left and right axles depending on the turning angle setting of the traveling manipulator, the displacement-control mechanism comprising:

a first steering link member extended from the steering manipulator;

a second steering link member extended from the steering displacement-control device;

a common end of the first and second steering link members; and a steering-setting rotary member operatively connected to the traveling manipulator or the traveling displacement-control device, the steering-setting rotary member being rotatable around a pivotal shaft so as to be switched between a forward-traveling position and a backward-traveling position, wherein the steering-setting rotary member is disposed at the forward-traveling position when the traveling manipulator and the traveling displacement-control device are disposed so as to set the traveling hydrostatic transmission into a forward traveling state, and wherein the steering-setting rotary member is disposed at the backward-traveling position when the traveling manipulator and the traveling displacement-control device are disposed so as to set the traveling hydrostatic transmission into a backward traveling state, the steering-setting rotary member including a guide slot in which the common end is slidably fitted and movable according to manipulation of the steering manipulator, wherein both ends of the guide slot are disposed opposite to each other with respect to an axis of the pivotal shaft so as to move in opposite directions to each other during the rotation of the steering-setting rotary member, and wherein a movement direction of the second steering link member relative to a movement direction of the common end along the guide slot is reversible in correspondence to whether the steering-setting rotary member is disposed at the forward-traveling position or the backward-traveling position.

10. The displacement-control mechanism according to claim 9, wherein, when the traveling manipulator and the traveling displacement-control device are disposed so as to set the traveling hydrostatic transmission into a neutral state, the steering-setting rotary member is disposed at a neutral position where the second steering link member is immovable regardless of the movement of the common end of the first and second steering link members along the guide slot by manipulation of the steering manipulator.

11. The displacement-control mechanism according to claim 9, further comprising:

a traveling-direction switching rotary member operatively interposed between the steering-setting rotary member and the traveling manipulator or the traveling displacement-control device, wherein the traveling-direction switching rotary member is rotatable so as to be switched between a forward-traveling position and a backward-traveling position depending on whether the traveling manipulator and the traveling displacement-control device are disposed so as to set the traveling hydrostatic transmission into the forward traveling state or the backward traveling state; and a mechanical biasing member for switching the traveling-direction switching rotary member between the forward-traveling position and the backward-traveling position, and for retaining the traveling-direction switching rotary member at the forward-traveling position or the backward-traveling position, wherein the switching of the steering-setting rotary member between the forward-traveling position and the backward-traveling position depends on the switching of the traveling-direction switching rotary member between the forward-traveling position and the backward-traveling position.

12. The displacement-control mechanism according to claim 11, wherein, when the traveling manipulator and the traveling displacement-control device are disposed so as to set the traveling hydrostatic transmission into a neutral state, the traveling-direction switching rotary member is disposed at a neutral position so as to set the steering-setting rotary member at a neutral position where the second steering link member is immovable regardless of the movement of the common end of the first and second steering link members along the guide slot by manipulation of the steering manipulator.

13. The displacement-control mechanism according to claim 11, the traveling-direction switching rotary member including a first portion and a second portion, further comprising:

a traveling link member extended from the traveling manipulator or the traveling displacement-control device, the traveling link member having an end opposite to the traveling manipulator or the traveling displacement-control device, wherein the end of the traveling link member is fitted to the traveling-direction switching rotary member so as to be movable relatively to the traveling-direction switching rotary member according to movement of the traveling manipulator or the traveling displacement-control device, wherein the traveling-direction switching rotary member is disposed at the forward-traveling position when the end of the traveling link member is pressed against the first portion of the traveling-direction switching rotary member, and wherein the traveling-direction switching rotary member is disposed at the backward-traveling position when the end of the traveling link member is pressed against the second portion of the traveling-direction switching rotary member.

14. The displacement-control mechanism according to claim 13, the traveling-direction switching rotary member further comprising:
a slot, in which the end of the traveling link member is fitted so as to be movable therein in correspondence to the movement of the traveling manipulator or the traveling displacement-control device,
wherein opposite ends of the slots of the traveling-direction switching rotary member serve as the first and second portions of the traveling-direction switching rotary member, and
wherein the switching of the traveling-direction switching rotary member between the forward-traveling position and the backward-traveling position depends on thrust of the end of the traveling link member against one of the ends of the slot of the traveling-direction switching rotary member, and on an overcenter spring action of the mechanical biasing member.

15. The displacement-control mechanism according to claim 13, the traveling-direction switching rotary member further comprising:
a guide hole having first and second edges serving as the first and second portions of the traveling-direction switching rotary member, wherein the end of the traveling link member is fitted in the guide hole so as to be selectively movable along either the first or second edge in correspondence to movement of the traveling manipulator or the traveling displacement-control device, and pressed against the selective first or second edge by the biasing member; and
an active portion selectively rotated in one of opposite directions depending on whether the first or second edge of the guide hole is pressed by the end of the traveling link member, wherein the steering-setting rotary member is fitted to the active portion so that the steering-setting rotary member is switched between the forward-traveling position and the backward-traveling position according to the rotation of the active portion.

16. The displacement-control mechanism according to claim 15, the guide hole of the traveling-direction switching rotary member further including a third portion between the first and second edges, wherein the end of the traveling link member is disposed at the third portion when the traveling manipulator and the traveling displacement-control device are disposed for setting the traveling hydrostatic transmission into a neutral state, and wherein when the end of the traveling link member is disposed at the third portion, the steering-setting rotary member is disposed at a neutral position where the second steering link member is immovable regardless of movement of the common end of the first and second steering link members along the guide slot of the steering-setting rotary member by manipulation of the steering manipulator.

17. The displacement-control mechanism according to claim 13,
the biasing member comprising:
a forward-traveling setting biasing member; and
a backward-traveling setting biasing member, and
the traveling-direction switching rotary member comprising:
a forward-traveling setting rotary member which can be switched between a neutral position and a forward-traveling position depending on an overcenter spring action; and
a backward-traveling setting rotary member which can be switched between a neutral position and a backward-traveling position depending on an overcenter spring action,
wherein the steering-setting rotary member is disposed at the forward-traveling position when the forward-traveling setting rotary member is disposed at the forward-traveling position and the backward-traveling setting rotary member is disposed at the neutral position, and
wherein the steering-setting rotary member is disposed at the backward-traveling position when the forward-traveling setting rotary member is disposed at the neutral position and the backward-traveling setting rotary member is disposed at the backward-traveling position.

18. The displacement-control mechanism according to claim 17, wherein, when the forward-traveling setting rotary member and the backward-traveling setting rotary member are disposed at the respective neutral positions, the second steering link member is immovable regardless of movement of the common end of the first and second steering link members along the guide slot of the steering-setting rotary member by manipulation of the steering manipulator.

* * * * *